United States Patent
Liu et al.

(10) Patent No.: US 10,076,869 B2
(45) Date of Patent: Sep. 18, 2018

(54) ELECTROSTATIC 3-D PRINTER USING LEVELING MATERIAL AND MECHANICAL PLANER

(71) Applicant: Xerox Corporation, Norwalk, CT (US)

(72) Inventors: Chu-heng Liu, Penfield, NY (US);
Paul J. McConville, Webster, NY (US);
William J. Nowak, Webster, NY (US);
Michael F. Zona, Webster, NY (US);
Robert A. Clark, Williamson, NY (US); Jorge A. Alvarez, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 65 days.

(21) Appl. No.: 15/175,476

(22) Filed: Jun. 7, 2016

(65) Prior Publication Data

US 2017/0348908 A1    Dec. 7, 2017

(51) Int. Cl.
*B29C 64/188* (2017.01)
*B29C 64/40* (2017.01)
(Continued)

(52) U.S. Cl.
CPC .......... *B29C 64/188* (2017.08); *B29C 64/106* (2017.08); *B29C 64/20* (2017.08); *B29C 64/214* (2017.08); *B29C 64/40* (2017.08); *B33Y 10/00* (2014.12); *G03G 15/1605* (2013.01); *G03G 15/224* (2013.01); *G03G 15/225* (2013.01); *B29C 64/223* (2017.08); (Continued)

(58) Field of Classification Search
CPC ......... B33Y 10/00; B33Y 30/00; B29C 64/20; B29C 64/264; B29C 64/268; B29C 64/106; B29C 64/118; B29C 64/141; B29C 64/147; B29C 64/153; B29C 67/0051; B22F 3/008; B29K 2105/251; G03G 15/14; G03G 15/224

USPC ...................... 425/174.4, 375; 399/320, 336
See application file for complete search history.

(56) References Cited

U.S. PATENT DOCUMENTS

| | | | |
|---|---|---|---|
| 6,066,285 A | 5/2000 | Kumar | |
| 6,775,504 B2 | 8/2004 | Godlove et al. | |
| 7,250,238 B2 | 7/2007 | Fromm et al. | |
| 7,270,408 B2 | 9/2007 | Odell et al. | |
| 7,851,549 B2 | 12/2010 | Sacripante et al. | |
| 8,470,231 B1 | 6/2013 | Dikovsky et al. | |
| 8,488,994 B2 | 7/2013 | Hanson et al. | |
| 8,784,723 B2 | 7/2014 | Napadensky | |
| 9,017,589 B2 | 4/2015 | Kritchman et al. | |
| 9,193,110 B2 | 11/2015 | Pridoehl et al. | |
| 2010/0121476 A1 | 5/2010 | Kritchman | |
| 2012/0276233 A1 | 11/2012 | Napadensky | |
| 2013/0186558 A1 | 7/2013 | Comb et al. | |

(Continued)

FOREIGN PATENT DOCUMENTS

WO    2013/044047 A1    3/2013

OTHER PUBLICATIONS

European Application No. 17174395.8, European Search Report dated Oct. 26, 2017, pp. 1-9.

*Primary Examiner* — Seyed Masoud Malekzadeh
*Assistant Examiner* — Lawrence D Hohenbrink, Jr.
(74) *Attorney, Agent, or Firm* — Gibb & Riley, LLC

(57) ABSTRACT

A three-dimensional (3-D) printer includes build and support material development stations positioned to transfer layers of build and support materials to an intermediate transfer surface. A platen having a flat surface is positioned to contact the intermediate transfer surface. The intermediate transfer surface transfers a layer of the build and support materials to the flat surface of the platen as the platen contacts one of the layers on the intermediate transfer surface. A dispenser is positioned to deposit a leveling material on the layer on the platen, and a mechanical planer is positioned to contact and level the leveling material on the layer on the platen to make the top of the leveling material parallel to the flat surface of the platen.

17 Claims, 29 Drawing Sheets

(51) Int. Cl.
    *G03G 15/16*     (2006.01)
    *G03G 15/22*     (2006.01)
    *B33Y 10/00*     (2015.01)
    *B29C 64/106*     (2017.01)
    *B29C 64/20*     (2017.01)
    *B29C 64/214*     (2017.01)
    *B33Y 30/00*     (2015.01)
    *B29K 105/00*     (2006.01)
    *B33Y 50/02*     (2015.01)
    *B29C 64/393*     (2017.01)
    *B29C 64/223*     (2017.01)

(52) U.S. Cl.
    CPC ...... *B29C 64/393* (2017.08); *B29K 2105/251* (2013.01); *B29K 2995/001* (2013.01); *B33Y 30/00* (2014.12); *B33Y 50/02* (2014.12)

(56) References Cited

U.S. PATENT DOCUMENTS

| | | |
|---|---|---|
| 2014/0134334 A1 | 5/2014 | Pridoehl et al. |
| 2015/0024169 A1* | 1/2015 | Martin ............... B29C 67/0092 428/172 |
| 2015/0142159 A1 | 5/2015 | Chang |
| 2015/0145174 A1 | 5/2015 | Comb |
| 2015/0266241 A1* | 9/2015 | Batchelder ......... B29C 67/0074 264/484 |
| 2017/0299973 A1* | 10/2017 | Frauens ............. B29C 67/0074 |

* cited by examiner

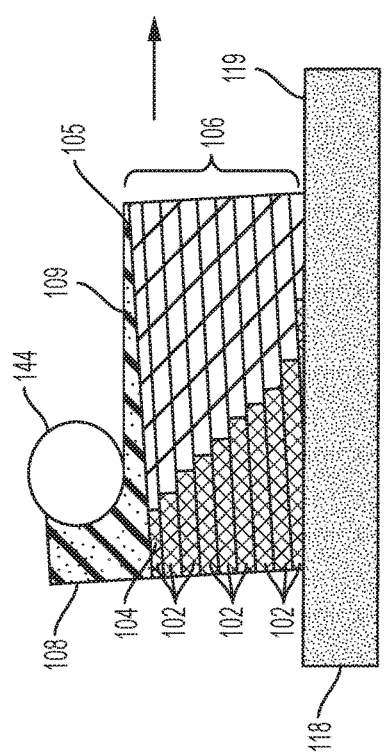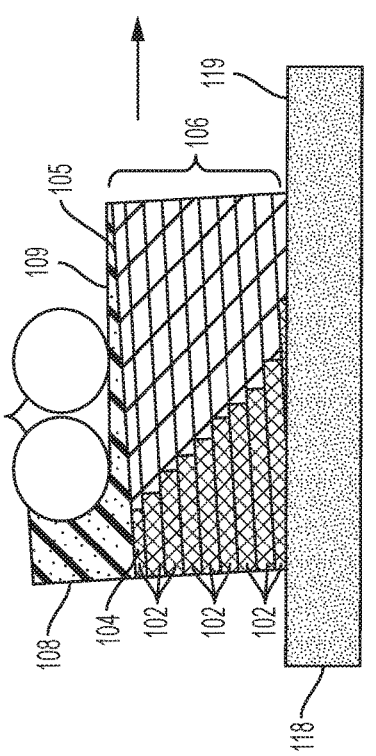

＃ ELECTROSTATIC 3-D PRINTER USING LEVELING MATERIAL AND MECHANICAL PLANER

BACKGROUND

Systems and methods herein generally relate to three-dimensional (3-D) printing processes that use electrostatic printing processes.

Three-dimensional printing can produce objects using, for example, ink-jet printers. In one exemplary process, a platen moves relative to an ink-jet to form a layer of build and support material on the platen, and each layer is hardened using a UV light source. These steps are repeated layer-by-layer. Support materials generally comprise acid-, base- or water-soluble polymers, which can be selectively rinsed from the build material after 3-D printing is complete.

The electrostatic (electro-photographic) process is a well-known means of generating two-dimensional digital images, which transfer materials onto an intermediate surface (such as a photoreceptor belt or drum). Advancements in the way an electro-photographic image is transferred can leverage the speed, efficiency, and digital nature of printing systems.

SUMMARY

Exemplary three-dimensional (3-D) printers include, among other components, an intermediate transfer surface, such as a drum or intermediate transfer belt (ITB), and build and support material development stations positioned to transfer (e.g., electrostatically or mechanically) build and support material to the ITB. The build and support material development stations transfer layers of the build and support materials to the ITB.

A transfuse station is adjacent the ITB, and a platen having a flat surface is positioned to repeatedly contact the ITB. The platen moves relative to the ITB, and the ITB transfers a layer of the build and support materials to the flat surface of the platen each time the platen contacts one of the layers on the ITB at the transfuse station to successively form a freestanding stack of the layers on the flat surface of the platen. Additionally, a fusing station is positioned to apply heat and pressure to the freestanding stack to fuse the layers together, and a curing station is positioned to apply heat and ultraviolet light to the freestanding stack (e.g., to crosslink polymers in the build material).

With such structures, a dispenser (e.g., a sprayer, a hopper, a chute, etc.), that is separate from the ITB, is positioned to deposit a leveling material on the top layer on the freestanding stack. Further, a mechanical planer, that is also separate from the ITB, is positioned to contact and level the leveling material on the freestanding stack so as to make the top of the leveling material parallel to the flat surface of the platen. The mechanical planer reduces the thickness of the leveling material on the freestanding stack. The mechanical planer comprises an elongated structure (e.g., a blade, a roller, counter-rotating rollers, etc.) that moves relative to the platen in a direction parallel to the flat surface of the platen.

The platen moves to the fusing station after the mechanical planer levels the leveling material to fuse the leveling material to the freestanding stack. The leveling material is selected to join relatively more readily with the build material, and join relatively less readily with the support material. In other words, the build material attracts the leveling material, while the support material repels the leveling material. Thus, after fusing, the leveling material will be fused with the build material, but will only remain in disperse areas of the support material. Those disperse portions of the leveling material will be removed when the support material is removed from the build material, while the portions of the leveling material that fuse with the build material will remain in the final structure with the build material.

These and other features are described in, or are apparent from, the following detailed description.

BRIEF DESCRIPTION OF THE DRAWINGS

Various exemplary systems and methods are described in detail below, with reference to the attached drawing figures, in which:

FIG. 13A-15B are expanded schematic diagrams illustrating devices herein;

DETAILED DESCRIPTION

Figure 1:
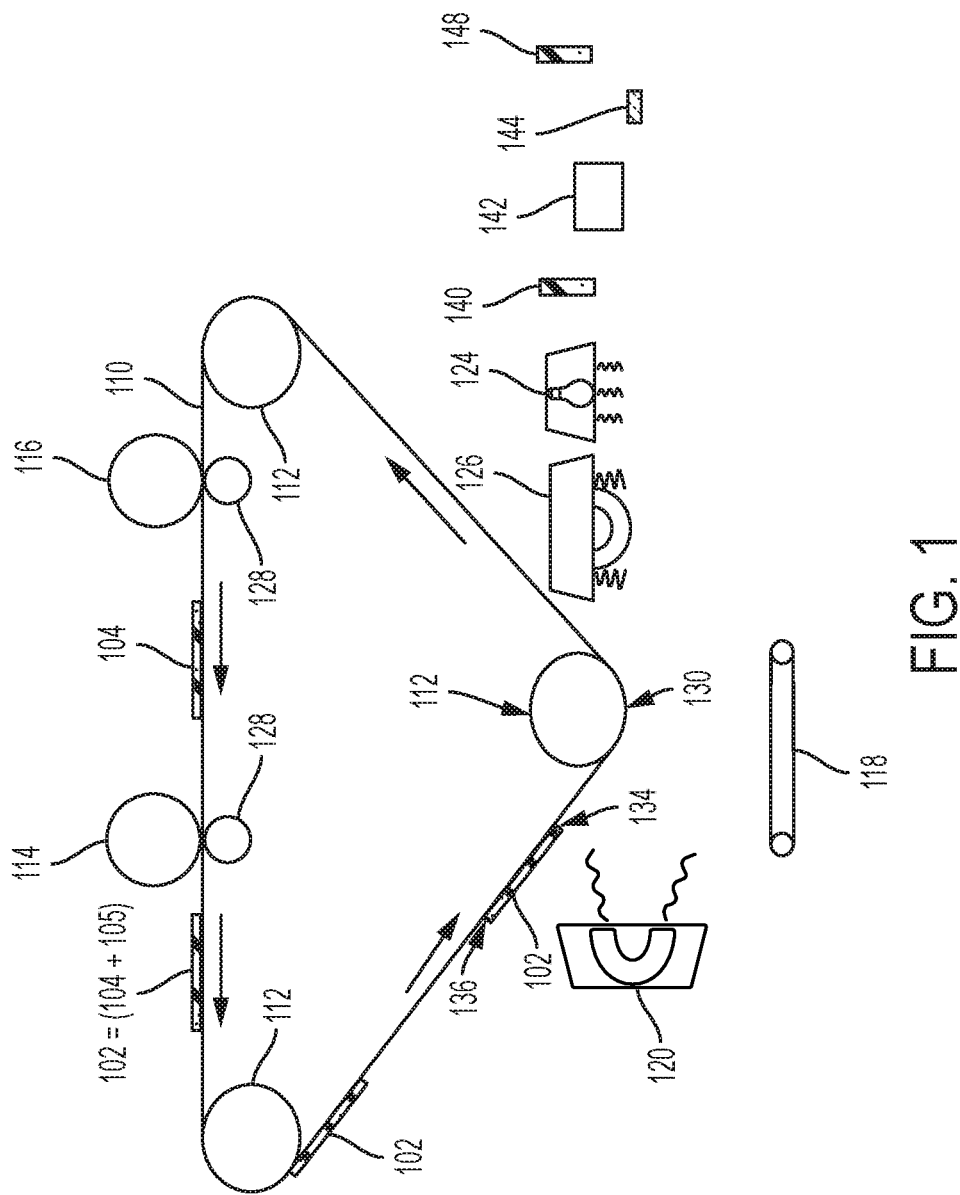
FIGS. 1-12 are schematic cross-section diagrams partially illustrating printing devices herein.

As mentioned above, electrostatic printing process are well-known means of generating two-dimensional (2-D) digital images, and the methods and devices herein use such processing for the production of 3-D items (for 3-D printing). However, when performing 3-D printing using electrostatic processes (especially those that use an ITB), the thickness uniformity and surface characteristics of each layer should be controlled to produce a well formed, accurate final 3-D part. Once the layers are placed on top of each other, any non-uniformity in the thickness of the individual layers, or mis-registration between the part and support material creates a malformed and/or objectionable final part due to the additive nature of the non-uniformities.

In view of such issues, the devices herein perform a leveling process to ensure the dimensional accuracy of the final part, as well as, the part-to-part repeatability. The devices herein use a leveling powder material and corresponding leveling process for improving part uniformity in a 3-D printing architecture using electrophotography.

To provide good development and transfer properties, the particle size distribution of build and support material should be tight and stable, to ensure uniform layer thickness. However, larger size particles create voids and non-uniformity in each layer that must be dealt with in the transfuse assembly. Small errors in each individual layer accumulate to larger dimensional errors after thousands of layers are fused together. For example, just a 1% error of each layer (e.g., using layers around 10 um thick) to build a part 10 cm tall, would introduce the error as large as 1 mm.

With devices herein, a third powder material (leveling powder), different from the build and support material, is applied to the top of a partially built/fused part, and then a removal device (e.g., by a blade or roll) at a precise height. Thus a mechanical device (e.g., a mechanical planer) is used to remove the extra leveling powder, creating a flat top surface for the partially built part. The leveling powder is then fused to become part of the structure (both the build and support materials) ready for the subsequent 3-D building process.

With structures herein, a typical sequence of steps includes developing/creating a powder layer using powders of build and support material. Build materials and support materials can be developed using two or more separate stations to form a uniform layer on a photoconductor or on an intermediate surface. The powder layer is then transfused to a partially build part (or a substrate if it were the first layer). Such processes are repeated, as necessary, to reach a desired thickness such that the surface unevenness is not excessive.

In order to compensate for any unevenness, the devices herein apply a thick layer of leveling powder. The leveling powder does not need to be charged, it can be applied in many ways, such as spray, hopper, and etc. Then, the leveling powder layer is leveled using a mechanical device, such as a blade, a roll, a pair of count-rotating rolls and etc. Finally, the leveling powder is fused to the remainder of the stack. This corrects any unevenness of the top build surface, and the 3-D build process can continue with good part precision.

Processing is then performed to remove the support material, and the leveling material within the support material. Based on the support material selection, a solvent-based process can be employed to remove the support material. To keep the leveling material from adversely affecting the removal of the support material, the leveling powder material, is selected to be compatible with the build material, when molten. This is to ensure the part strength. In one example, the base material for the leveling powder can be same as the build material.

To facilitate easy removal of the support material, the leveling material is selected to prevent the leveling material from forming a film or large clusters in the support material. From a material design standpoint, the leveling material is incompatible with the support material, when molten, and so that the leveling material does not form a thin film.

This can be achieved by selecting the support material to have a relatively low surface energy and contact angle, so that the leveling material has relatively high surface tension, and forms into discrete, disconnected islands within the support material due to surface tension. A contact angle (per the Young equation) less than 90° indicates that wetting of the surface is favorable, and the fluid will spread over a large area on the surface; while contact angles greater than 90° generally means that wetting of the surface is unfavorable, so the fluid will minimize its contact with the surface and form a compact liquid droplet. Leveling powders are selected to have high contact angles (e.g., greater than 60°, 75°, 90°, etc.) to the support material to cause the leveling material to have high surface tension on the support material, to form droplets on the support material, and to not join with the support material (and the inverse is true with respect to the leveling material and the build material).

Due to this surface tension (contact angle) effect through selection of the support material and leveling material, droplet (or isolated island) formation of the leveling material within the support material will be encouraged. In addition, during subsequent layer building, dispersion of the leveling material will be encouraged in areas where the leveling material is surrounded by large volumes of incompatible support material fluid. This enables easy removal of the portion of leveling material that is within the support material.

The particle size of the leveling powder is selected to be optimized for performance, and can be significantly different from that of the build/support materials. More specifically, the particle size of the leveling material is selected with respect to the anticipated unevenness and leveling gap. The particle size of the leveling powder is selected so that only a small number of leveling powder particle layers (e.g., 1-3 layers) will fill the leveling gap.

Alternatively, the materials can be selected so that the gap between the leveling device surface and the peak of the build surface is less than one full layer (one particle diameter). In this situation, only the surface that is significantly lower than the peak of the build surface will receive the leveling material. This process will use the least amount leveling material and will have the least concern on the potential impact on the support removal. Thus, larger particle sized leveling materials will use less leveling material; however, smaller particle sized leveling will ensure better leveling precision.

As shown, for example, in FIG. 1, exemplary three-dimensional (3-D) printers herein include, among other components, an intermediate transfer surface, such as an intermediate transfer belt 110 (ITB) supported on rollers 112, a first printing component (e.g., development device 116), and a second printing component (e.g., development device 114). Thus, as shown in FIG. 1, the first printing component 116 is positioned to electrostatically transfer (by way of charge difference between the belt (produced by charge generator 128, for example) and the material being transferred) a first material 104, the build material, such as a (potentially dry) powder polymer-wax material (e.g., charged 3-D toner) to the ITB 110. The second printing component 114 (which can also be, for example, a photoreceptor) is also positioned to electrostatically transfer a second material 105 (e.g., the support material, again such as a powder polymer-wax material (e.g., charged 3-D toner)) to a location of the ITB 110 where the first material 104 is located on the ITB 110.

The support material 105 dissolves in solvents that do not affect the build material 104, to allow the printed 3-D structure 104 to be separated from the support material 105 after the full 3-D item is complete. In the drawings, the combination of the build material 104 and the support material 105 is shown as element 102, and is sometimes referred to as a "developed layer." The developed layer 102 of the build material 104 and the support material 105 is on a discrete area of the ITB 110 and is in a pattern corresponding to the components of the 3-D structure in that layer (and its associated support elements), where the 3-D structure is being built, developed layer 102 by developed layer 102.

Additionally, a platen 118 (which can be a surface or belt) is adjacent the ITB 110. Patterned layers 102 of build and support material are transferred from the development devices 114, 116 to the intermediate transfer belt 110, and eventually to the platen 118 at a transfuse station 130.

As shown in FIG. 1, the transfuse station 130 is adjacent the ITB 110. The transfuse station 130 includes a roller 112, on one side of the ITB 110, supporting the ITB 110. The transfuse station 130 is positioned to receive the layers 102 as the ITB 110 moves to the transfuse station 130. More specifically, the build material development station 116 the support material development station 114, and the transfuse station 130 are positioned relative to the ITB 110 such that a layer 102 on the ITB 110, when the ITB 110 is moving in a process direction, first passes the build material and support material development stations 114, 116, and then passes the transfuse station 130.

As further shown in FIG. 1, such structures can include a transfuse heater 120, a fusing station 126, a curing station 124, and a cooling station 140. The fusing station 126 applies pressure and/or heat to fuse the most recently transfused layer 102 to the platen 118 or the layers present on the platen 118. The curing station 124 is positioned to apply light (e.g. UV light) using a light source and/or heat using a heater to cure the layers. The cooling station 140 blows potentially cooled air on the layer that has just been fused and cured. The structure can also include a support material removal station 148.

FIG. 1 also illustrates a dispenser 142 (e.g., a sprayer, a hopper, a chute, etc.) that is separate from the ITB 110 and is positioned to deposit a leveling material on the top layer on the freestanding stack on the platen 118. Further, a mechanical planer 144 is also separate from the ITB 110 and is positioned to contact and level the leveling material on the freestanding stack so as to make the top of the leveling material parallel to the flat surface of the platen 118. The mechanical planer 144 reduces the thickness of the leveling material on the freestanding stack. The mechanical planer 144 comprises an elongated structure (e.g., a blade, a roller, counter-rotating rollers, etc.) and there is relative movement between the mechanical planer 144 and the platen 118 in a direction parallel to the flat surface of the platen 118.

Figure 2:
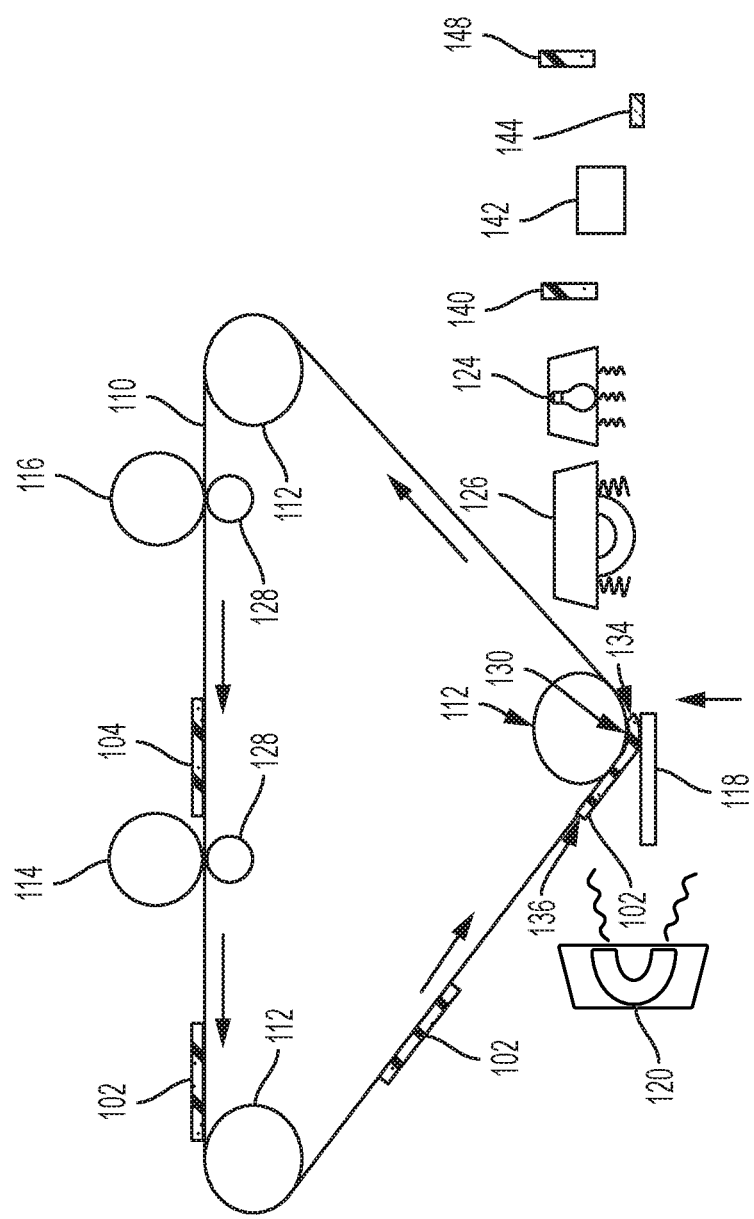

As shown by the vertical arrow in FIG. 2, the platen 118 moves (using motors, gears, pulleys, cables, guides, etc. (all generally illustrated by item 118)) toward the ITB 110 to have the platen 118 make contact with the ITB 110. The developed layer 102 and ITB 110 can optionally be locally heated by heater 120 to further help bring the developed layer 102 to a "tacky" state prior to transfuse. In one example, the developed layer 102 can be heated to a temperature higher than the glass transition temperature (Tg) but short of the melt or fuse temperature (Tm) of the support material, to allow the support material (and potentially the build material) to become tacky.

The platen 118 can also optionally be heated by heater 120 to approximately the same temperature, and then be contacted synchronously with the tacky layer 102 as it translates through the ITB-platen nip (the transfuse nip 130). Thereby, the ITB 110 transfers one of the developed layer 102 of the build material 104 and the support material 105 to the platen 118 each time the platen 118 contacts the ITB 110, to successively form developed layers 102 of the build material 104 and the support material 105 on the platen 118.

Therefore, the build and support material that is electrostatically printed in a pattern on the ITB by each separate development device 114, 116, is combined together in the developed layers 102 to represent a specific pattern having a predetermined length. Thus, as shown in FIG. 2, each of the developed layers 102 has a leading edge 134 oriented toward the processing direction in which the ITB 110 is moving (represented by arrows next to the ITB 110) and a trailing edge 136 opposite the leading edge 134.

More specifically, as shown in FIG. 2, at the transfuse nip 130, the leading edge 134 of the developed layer 102 within the transfuse nip 130 begins to be transferred to a corresponding location of the platen 118. Thus, in FIG. 2, the platen 118 moves to contact the developed layer 102 on the ITB 110 at a location where the leading edge 134 of the developed layer 102 is at the lowest location of the roller of the transfuse nip 130. Thus, in this example, the trailing edge 136 of the developed layer 102 has not yet reached the transfuse nip 130 and has not, therefore, yet been transferred to the platen 118.

Figure 3:
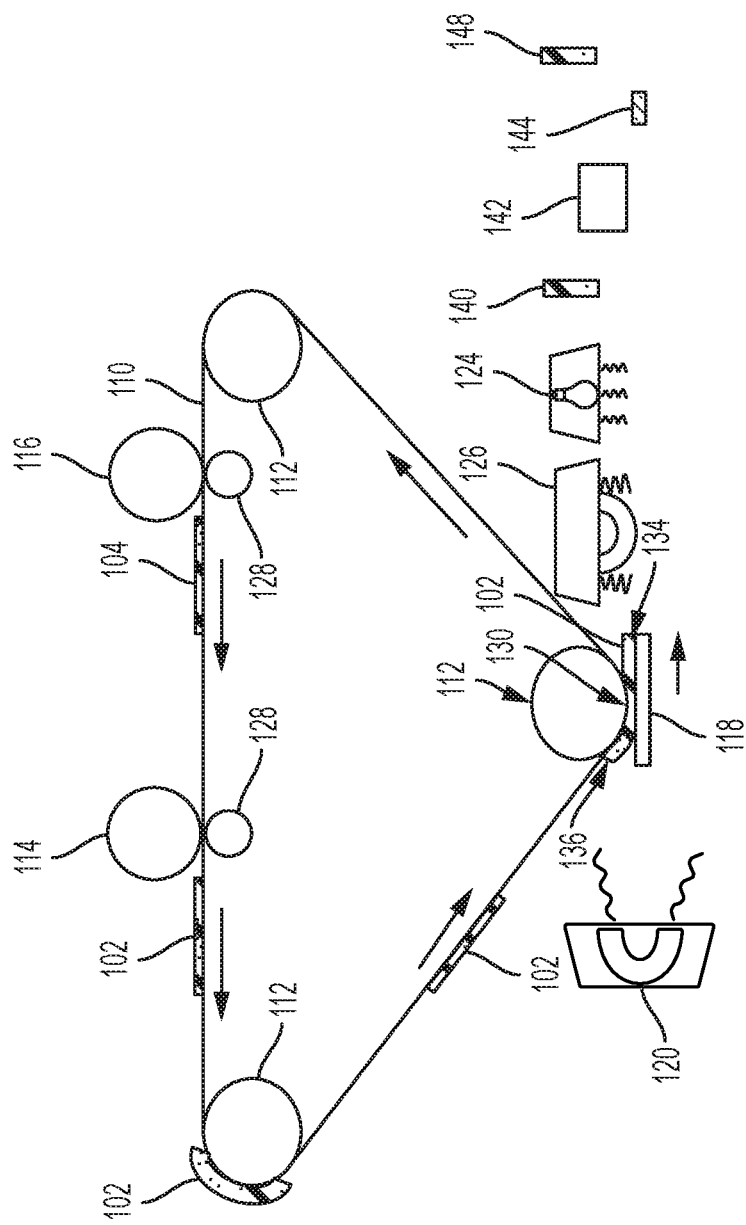

As shown in FIG. 3, the platen 118 moves synchronously with the ITB 110 (moves at the same speed and the same direction as the ITB 110) either by moving or rotating the platen vacuum belt, to allow the developed layers 102 to transfer cleanly to the platen 118, without smearing. In FIG. 3, the trailing edge 136 of the developed layer 102 is the only portion that has not yet reached the transfuse nip 130 and has not, therefore, been transferred to the platen 118.

Figure 4:
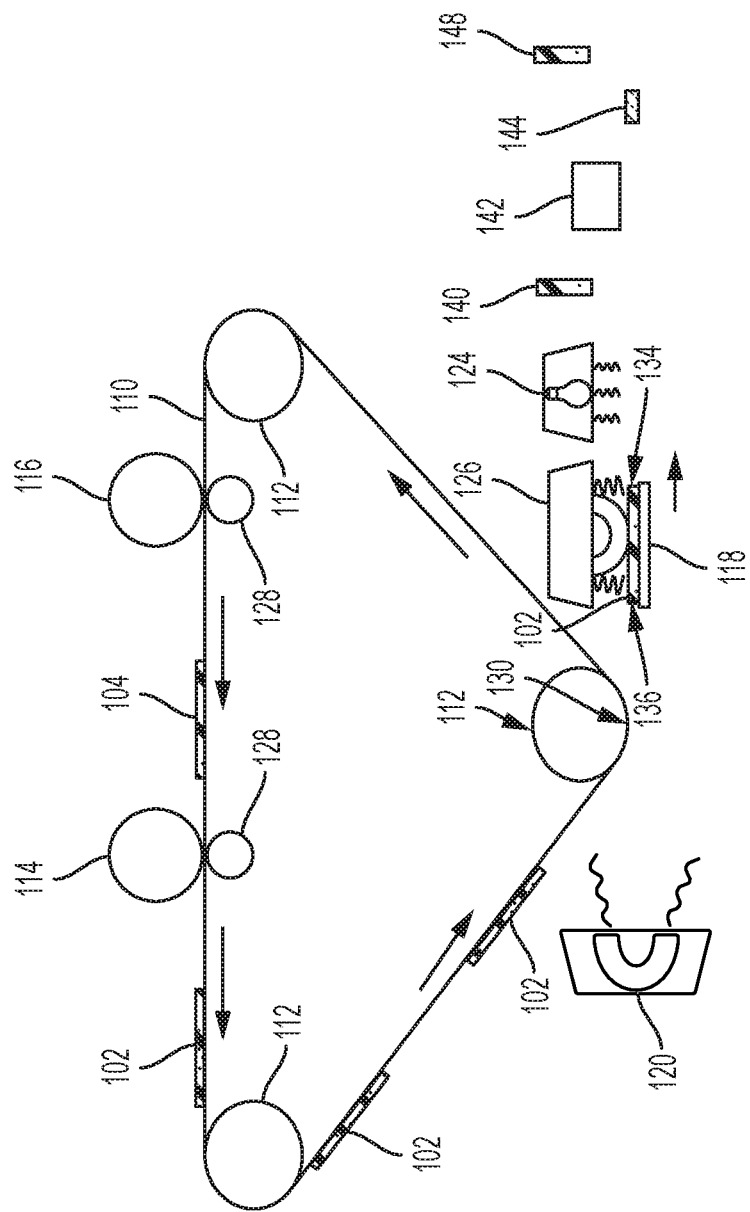

Then, as the ITB 110 moves in the processing direction, the platen 118 moves at the same speed and in the same direction as the ITB 110, until the trailing edge 136 of the developed layer 102 reaches the bottom of the roller of the transfuse nip 130, at which point the platen 118 moves away from the ITB 110 and over to the fusing station 126, as shown in FIG. 4. The fusing station 126 can be a non-contact (e.g., infrared (IR)) heater, or a pressure heater, such as a fuser roller that heats and presses the layer(s) 102. If the fusing station 126 is a pressure roller, the platen 118 moves synchronously as the roller rotates, heating and pressing to fuse the developed layer 102 to the platen 118. This synchronous movement between the platen 118 and the ITB 110 (and heated roller 126) causes the pattern of support and builds materials (102) that are printed by the development devices 116, 114 to be transferred precisely from the ITB 110 and fused to the other layers 102 on the platen 118, without distortion or smearing.

Figure 5:
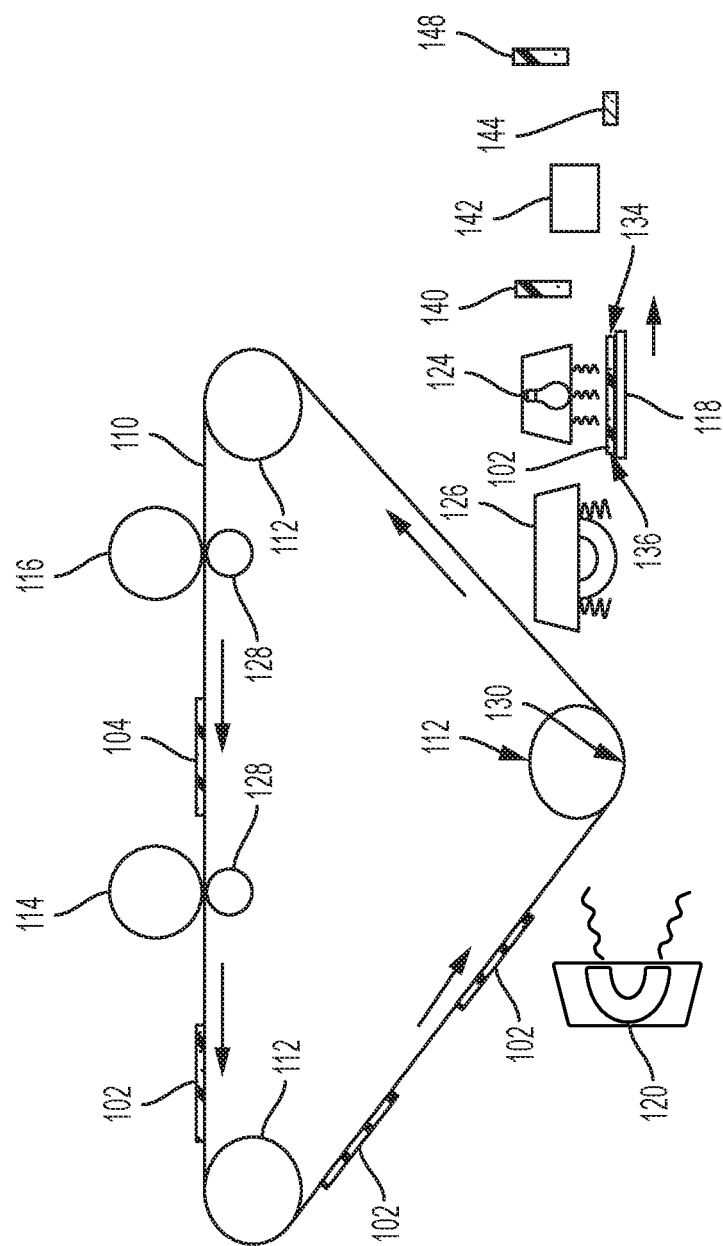

As shown in FIG. 5, the platen moves to the curing station 124 which applies light and/or heat to the 3-D structure to bond the developed layers 102 in the freestanding stack 106 to one another on the platen 118. The selective use of heaters, lights, and other components in the bonding station 124 will vary depending upon the chemical makeup of the developed layers 102. In one example, the build material 104 and the support material 105 can be UV curable toners. Therefore, as shown in FIG. 5, in one example the fusing station 124 can fuse such materials 102 by heating the materials 102 to a temperature between their glass transition temperature and their melting temperature, and then applying UV light to cross-link the polymers within the materials 102, thereby creating a rigid structure. Those ordinarily skilled in the art would understand that other build and support materials would utilize other bonding processing and bonding components, and that the foregoing is presented only as one limited example; and the devices and methods herein are applicable to all such bonding methods and components, whether currently known or developed in the future.

Figure 6:
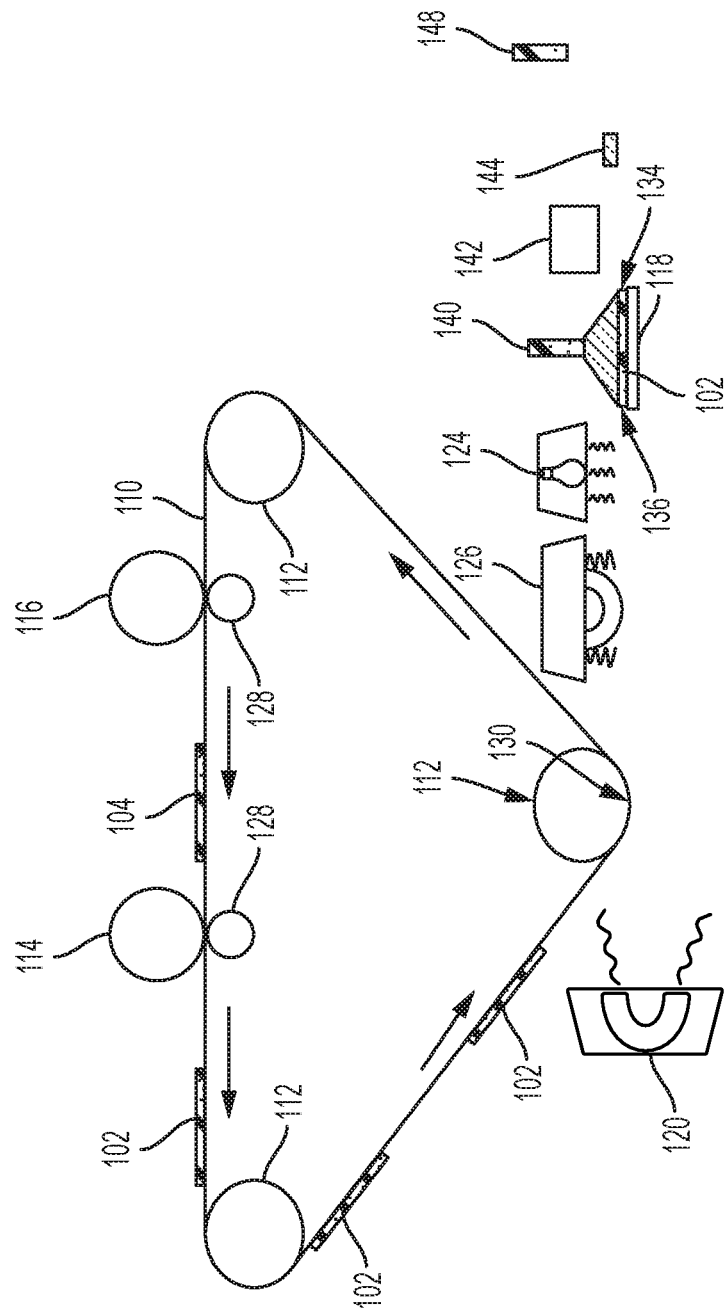

Additionally, as shown in FIG. 6, the cooling station 140 (or even a cooling pause in processing) can be used to cool the layers 102 on the platen 118 between layer 102 transfers. The cooling station can blow air (potentially cooled and dehumidified air) on the layer 102 on the platen 118, as shown in FIG. 6.

The platen 118 can move to the fusing station 126, curing station 124, and cooling station 140 after each time the ITB 110 transfers each of the developed layers 102 to the platen 118 to independently fuse, cure, and cool each of the developed layers 102. In other alternatives, the platen 118 may only move to the fusing station 126, curing station 124, and cooling station 140 after a specific number (e.g., 2, 3, 4, etc.) of the developed layers 102 have been placed on the platen 118 to allow multiple developed layers 102 to be simultaneously fused, cured, and cooled.

Figure 7:
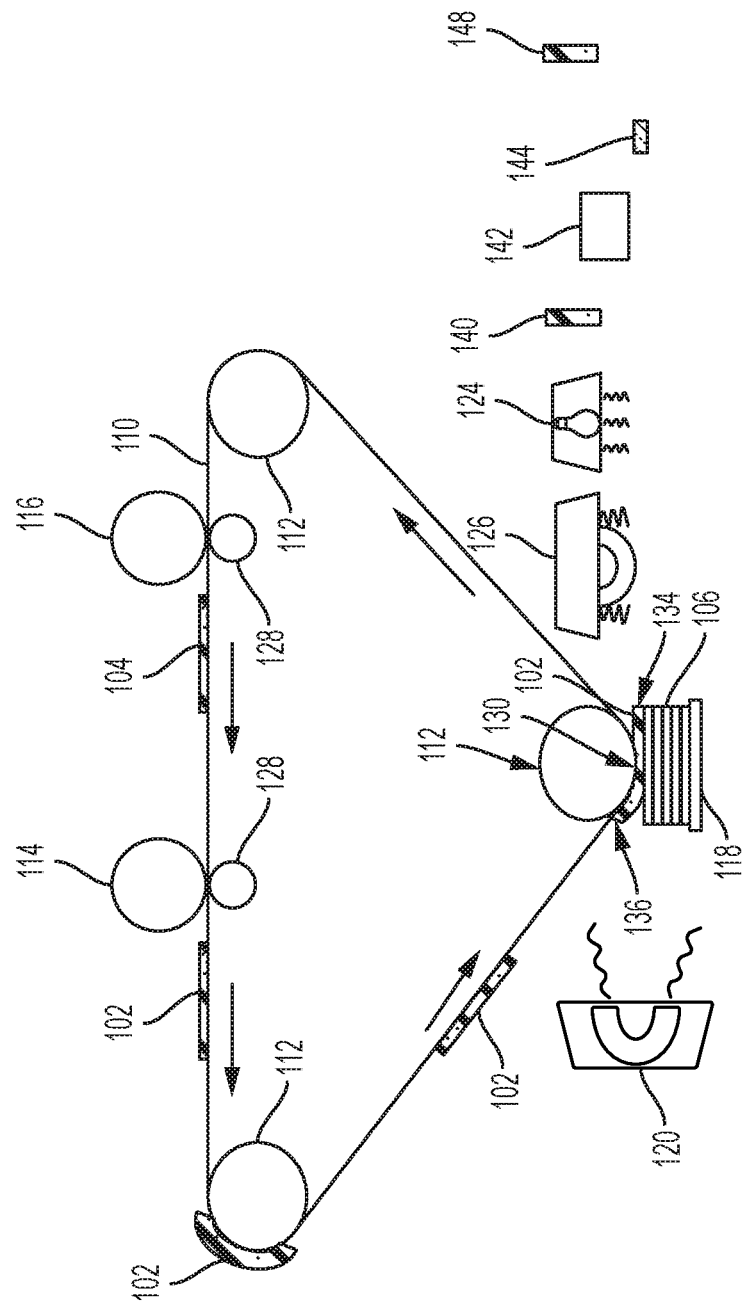
Figure 8:
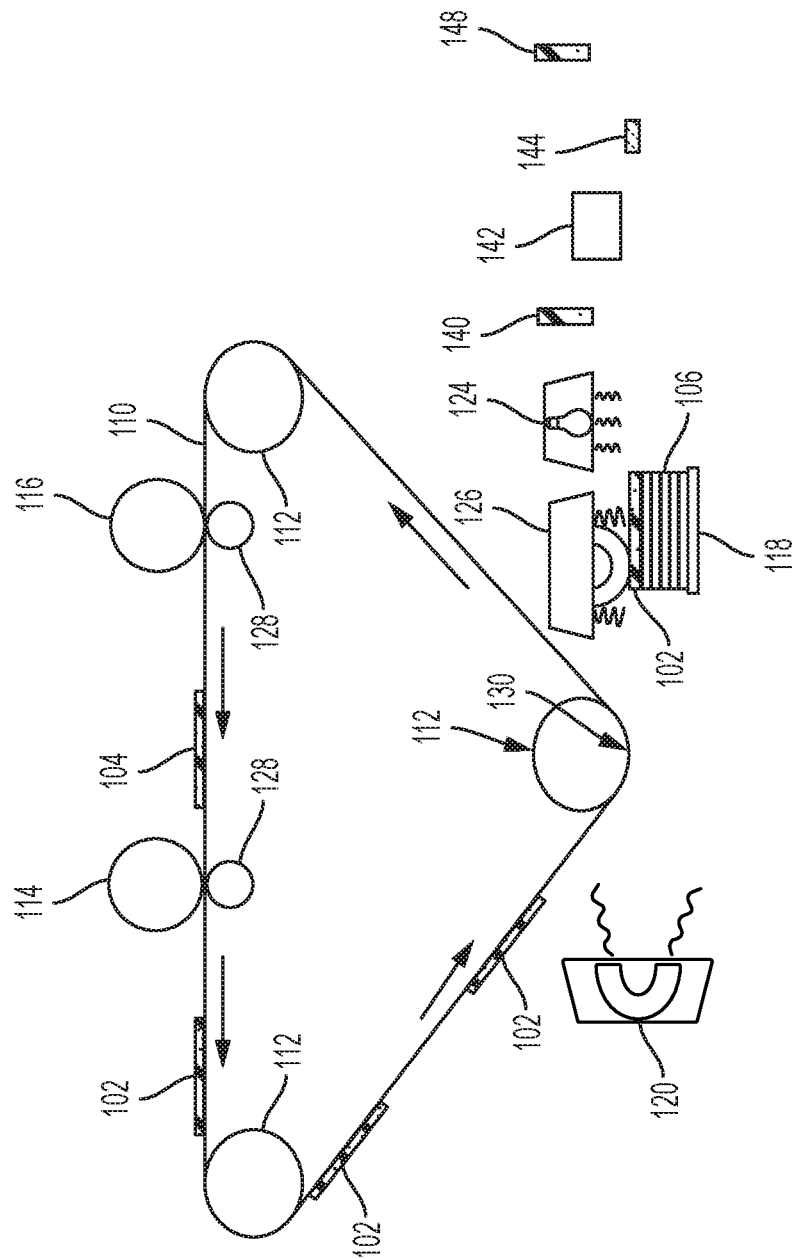
Figure 9:
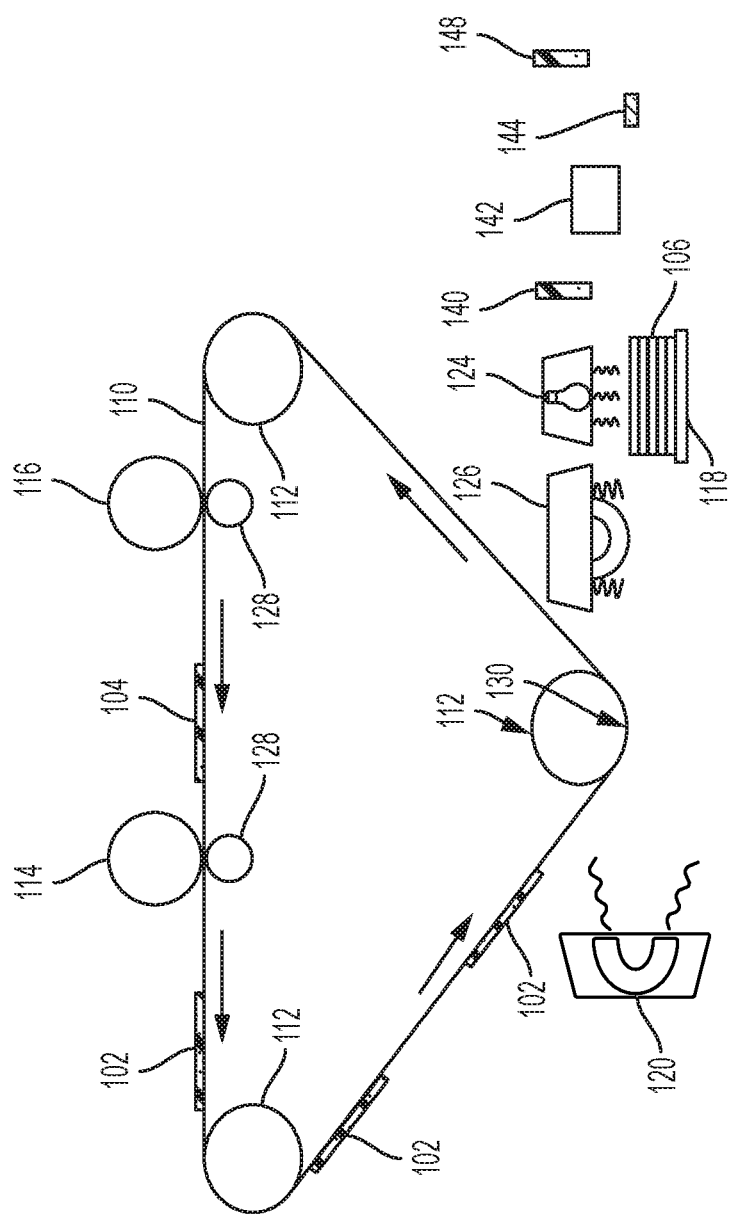
Figure 10:
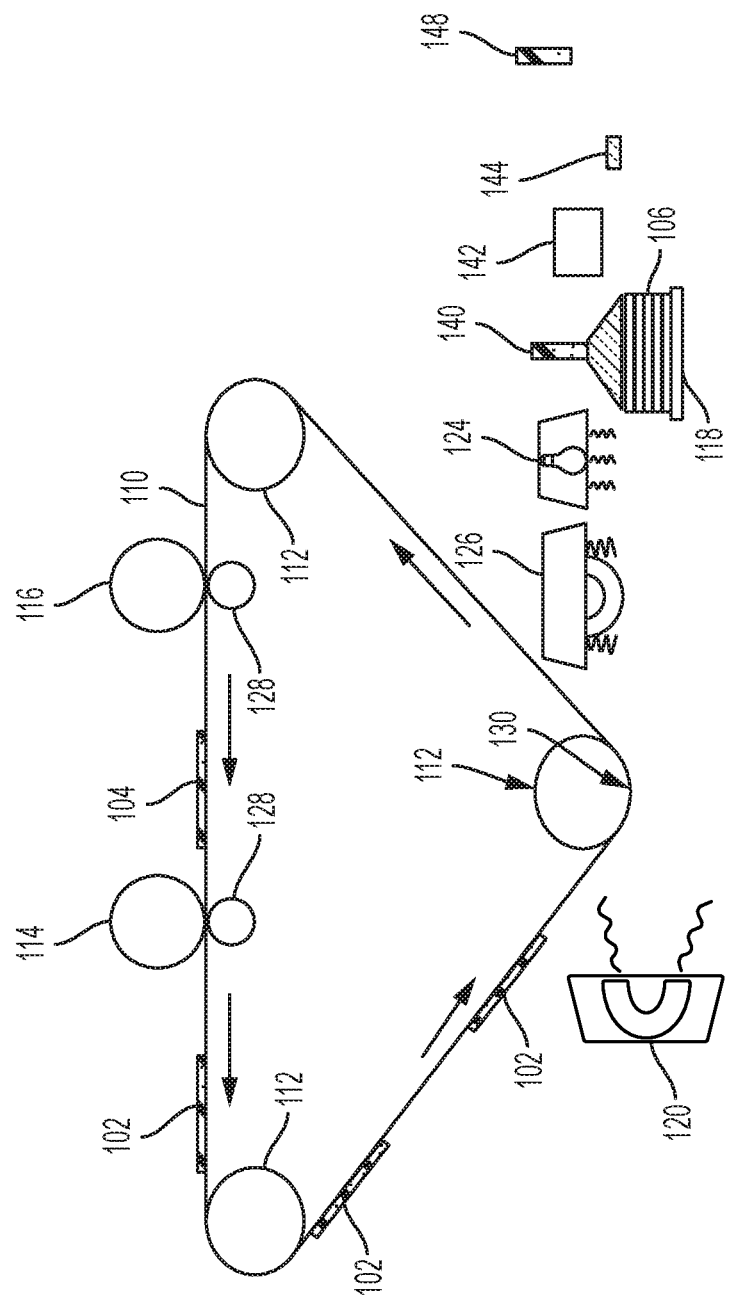

At this point in processing the platen 118 can return to the transfuse nip 130 to receive the next layer 102 from the ITB 110, or the platen can move to the dispenser 142 and the mechanical planer 144 (that are discussed in greater detail below). Thus, the processing in FIGS. 2-6 is repeated to fuse multiple developed layers 102 into a stack 106, as shown in FIG. 7. As the stack 106 of the developed layers 102 grows, additional developed layers 102 are formed on top of the stack 106, as shown in FIG. 7, and such additional developed layers 102 are pressure heated by the fusing station 126 (FIG. 8), cured by the curing station 124 (FIG. 9), and cooled by the cooling station 140 (FIG. 10).

Figure 11:
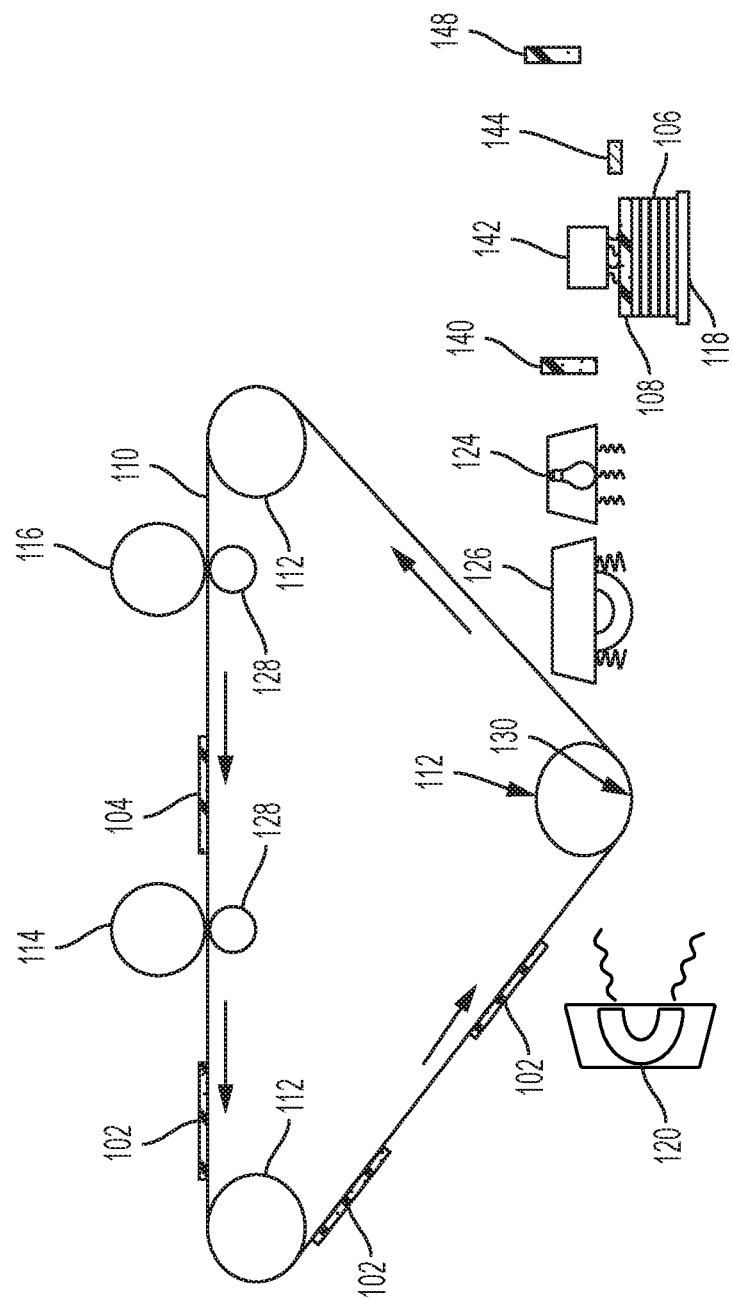
Figure 12:
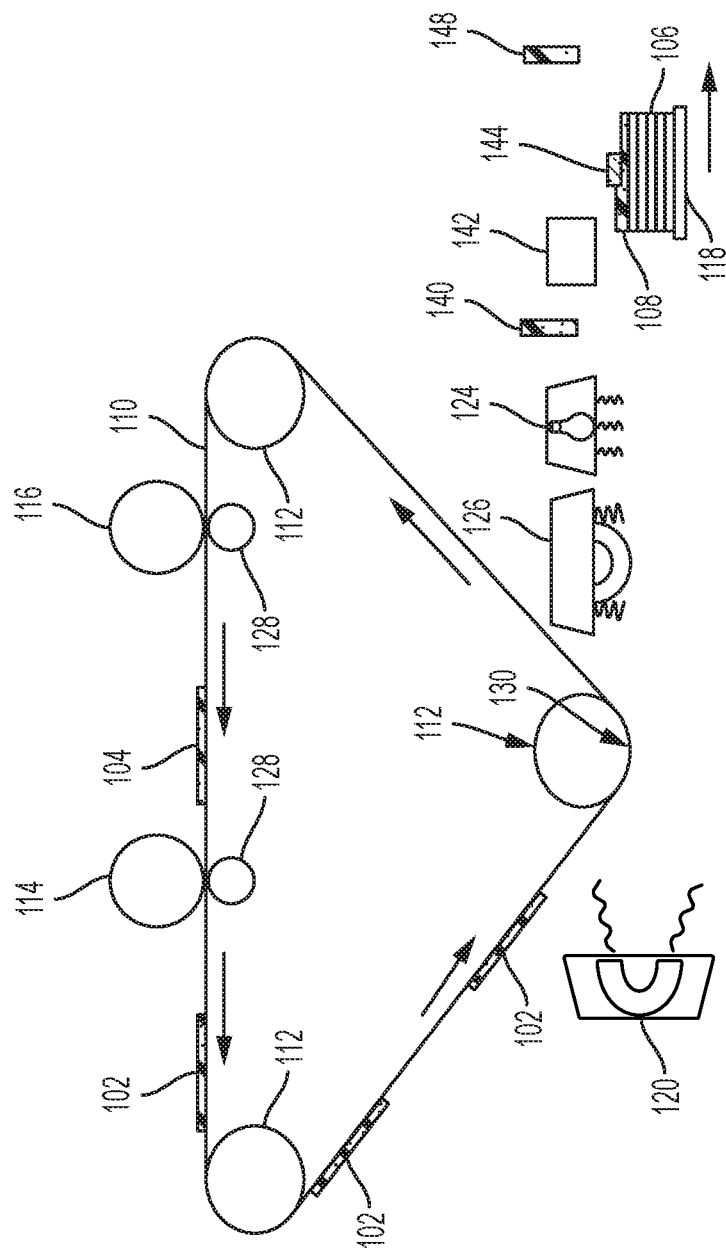

The processing shown in FIGS. 11 and 12 can be performed for each layer that is transfused onto the platen 118, or can be performed after a specific number of layers 102 have been transferred to the platen 118 (e.g., 10, 50, 200, 1000, layers, etc.). As shown in FIG. 11, the dispenser 142 (again, that can be a sprayer, a hopper, a chute, electrostatic device, etc.) that is separate from the ITB 110 deposits a leveling material 108 on the top layer 102 within the freestanding stack 106 on the platen 118. Further, as shown in FIG. 12, a mechanical planer 144 is also separate from the ITB 110 and makes contact and levels the leveling material 108 on the freestanding stack 106 so as to make the top of the leveling material 108 parallel to the flat surface of the platen 118.

Figure 13A:
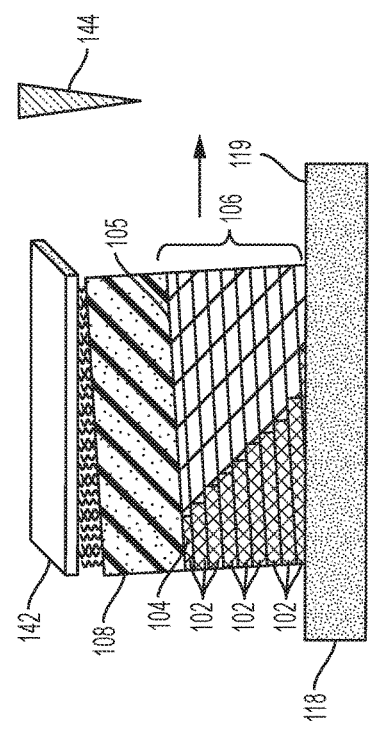

Such processing is shown in expanded view in FIGS. 13A-15B. More specifically, FIG. 13A illustrates that the dispenser 142 deposits the leveling material 108 on the top of the freestanding stack 106. Again, the dispenser 142 can spray, gravity feed, electrostatically transfer, etc., the leveling material 108 to the top of the freestanding stack 106. Note that FIG. 13A shows that the freestanding stack 106 is made up of one or more layers 102, each of which can include the build material 104 and the support material 105. Note also that at least the top layer in the stack 106 is not parallel to the top 119 of the platen 118 in FIG. 13A.

Figure 13B:
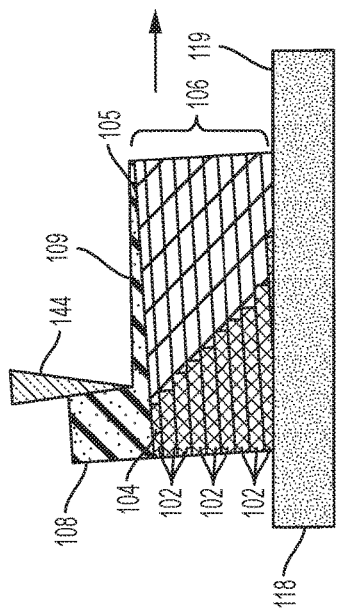

FIGS. 13A and 13B illustrates that the mechanical planer 144 can be a blade or other projection. FIG. 13B illustrates that the mechanical planer 144 removes a portion of the leveling material 108 based on relative movement between the mechanical planer 144 and the platen 118 so as to make the top 109 of the leveling material 108 parallel to the top 119 of the platen 118. FIG. 13B illustrates that the platen 118 can move past the mechanical planer 144 (which can be in a fixed position). Alternatively, the mechanical planer 144 can move past the platen 118 to cause relative movement between the mechanical planer 144 and the platen 118 in a direction parallel to the flat surface 119 of the platen 118.

Figure 14:
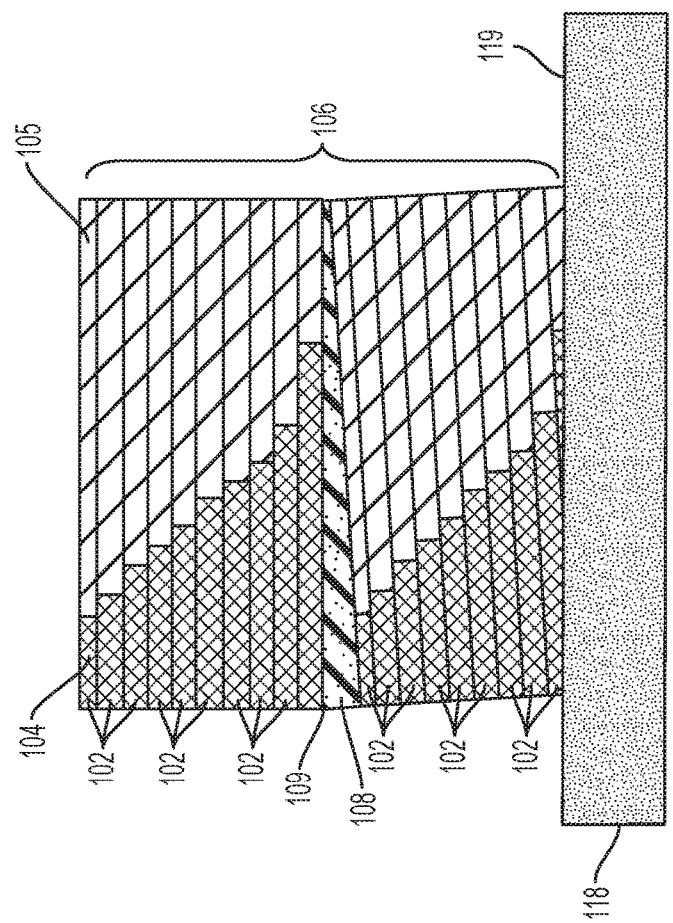

Therefore, the mechanical planer 144 reduces the thickness of the leveling material 108 on the freestanding stack 106. FIG. 14 illustrates the freestanding stack 106 after additional layers 102 have been deposited over the leveling material 108. As can be seen in FIG. 14, the leveling material 108 allows additional layers 102 to be transfused on to a surface 109 that is parallel to the top 119 of the platen 118 to grow the entire 3-D structure being printed using layers 102 that are parallel to the top 119 of the platen 118. As shown in FIGS. 13A-13B, the mechanical planer 144 can be an elongated structure (e.g., a blade); or as shown in FIG. 15A, the mechanical planer 144 can be a roller; or counter-rotating rollers as shown, FIG. 15B; etc.

Figure 16:
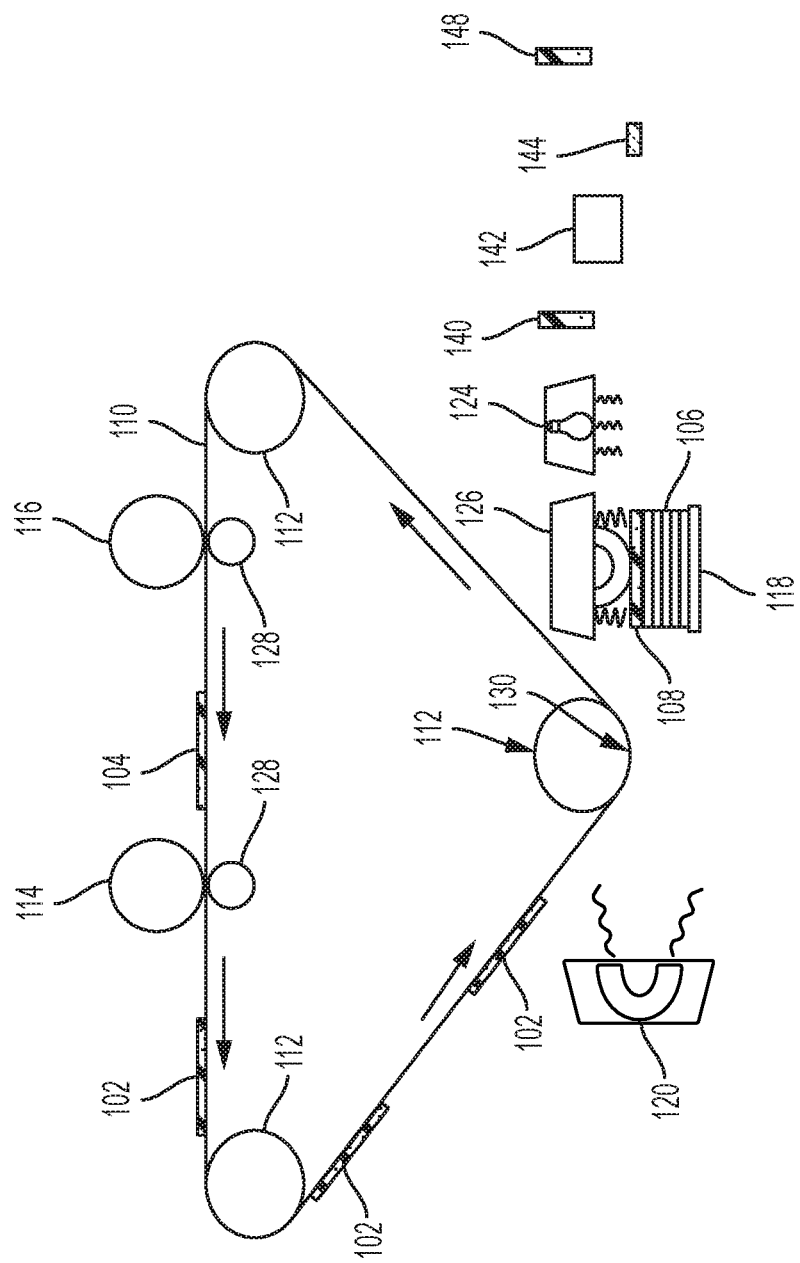
FIG. 16 is schematic cross-section diagrams partially illustrating printing devices herein.

As shown in FIG. 16, after the mechanical planer 144 levels the leveling material 108, the platen 118 moves to the fusing station 126 after the mechanical planer 144 levels the leveling material 108 to fuse the leveling material 108 to the freestanding stack 106. The leveling material 108 is selected to join relatively more readily with the build material 104, and join relatively less readily with the support material 105. In other words, the build material 104 attracts the leveling material 108, while the support material 105 repels the leveling material 108.

Figure 17:
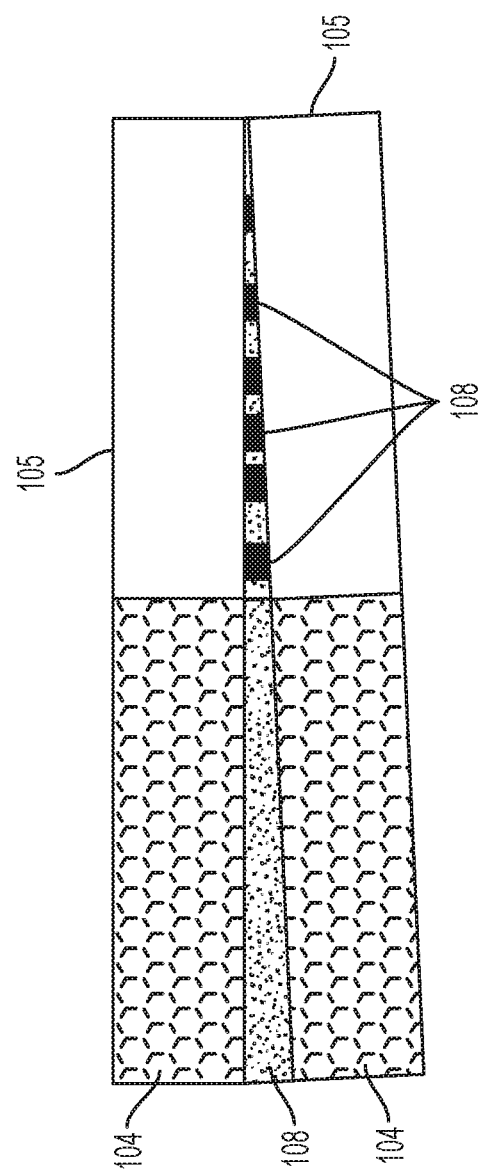
FIG. 17 is an expanded schematic diagrams illustrating devices herein.

Thus, as shown in FIG. 17, after fusing, the leveling material 108 will be fused with the build material 104, but will only remain in disperse areas of the support material 105. Those disperse portions of the leveling material 108 (contacting the support material 105) will be removed when the support material 105 is removed from the build material 104, while the portions of the leveling material 108 that fuse with the build material 104 will remain in the final structure with the build material 104.

Figure 18:
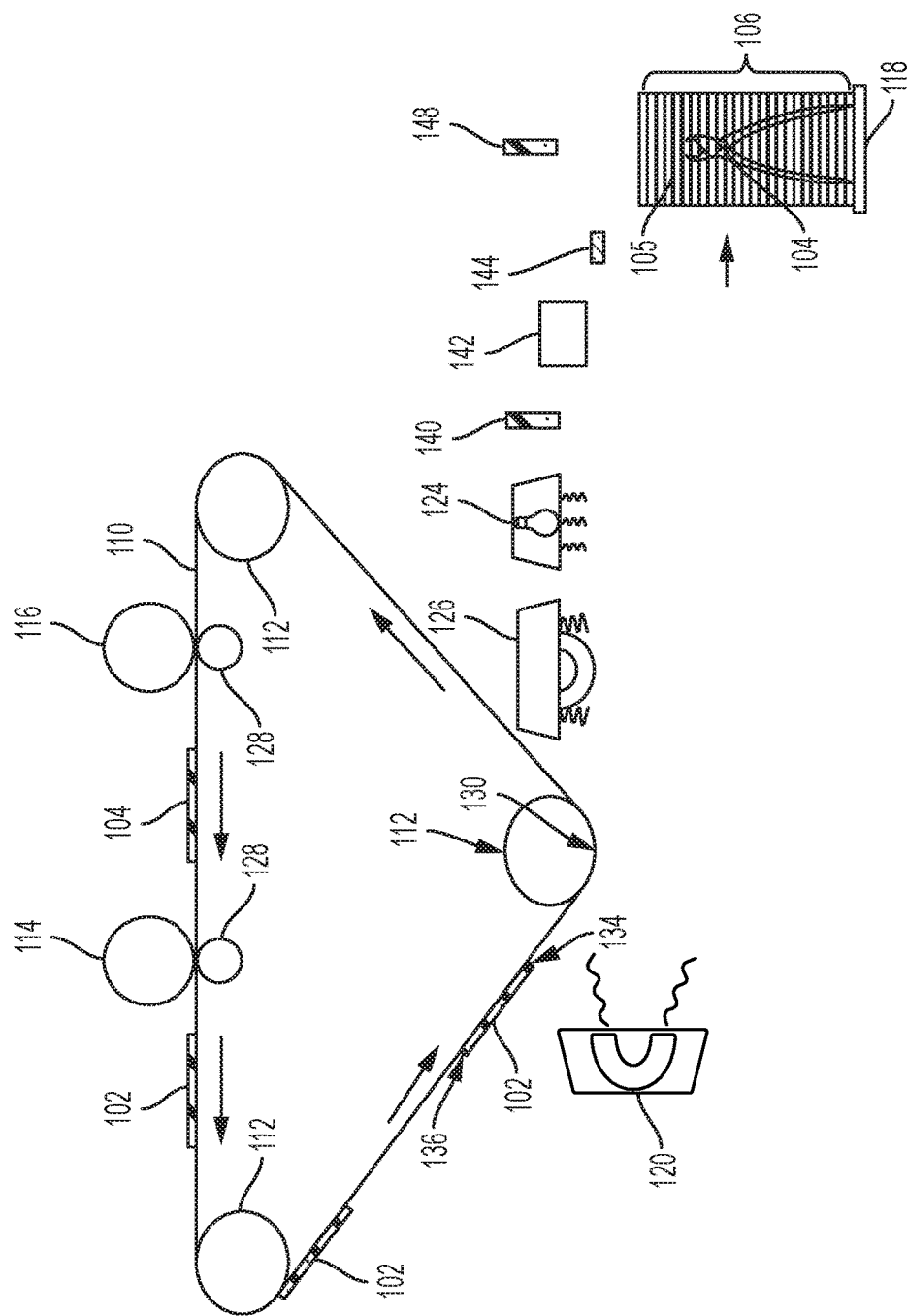
FIGS. 18-26 are schematic cross-section diagrams partially illustrating printing devices herein.

The processing described above is repeated many times to form the freestanding stack 106 of build and support material 104, 105 as shown in FIG. 18. FIG. 18 illustrates an overlay showing portions of support material 105 and build material 104 within the accumulation of the freestanding stack 106. Such may or may not be visible, and is only illustrated to show one exemplary way in which such build and support materials may be arranged.

Figure 19:
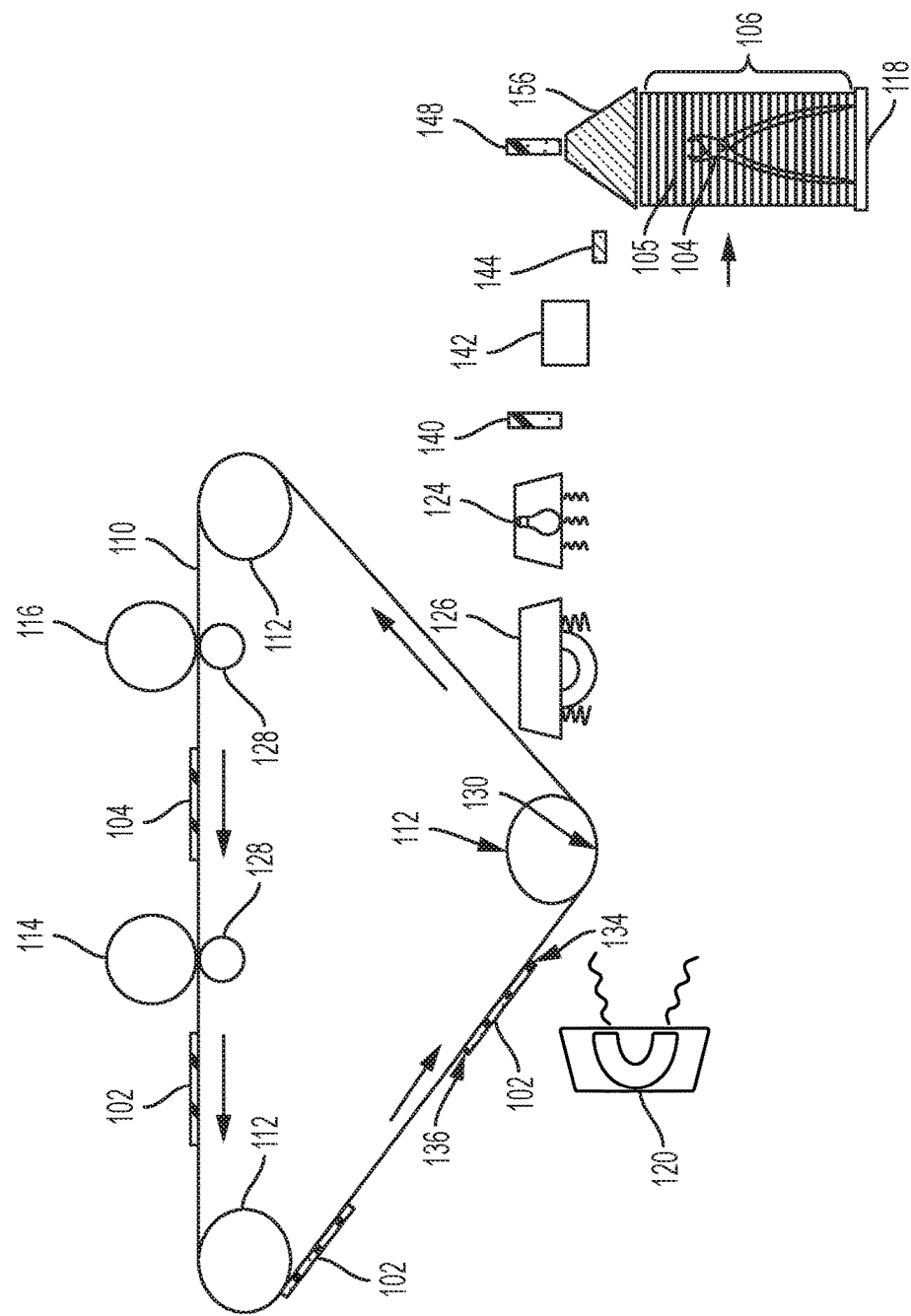
Figure 20:
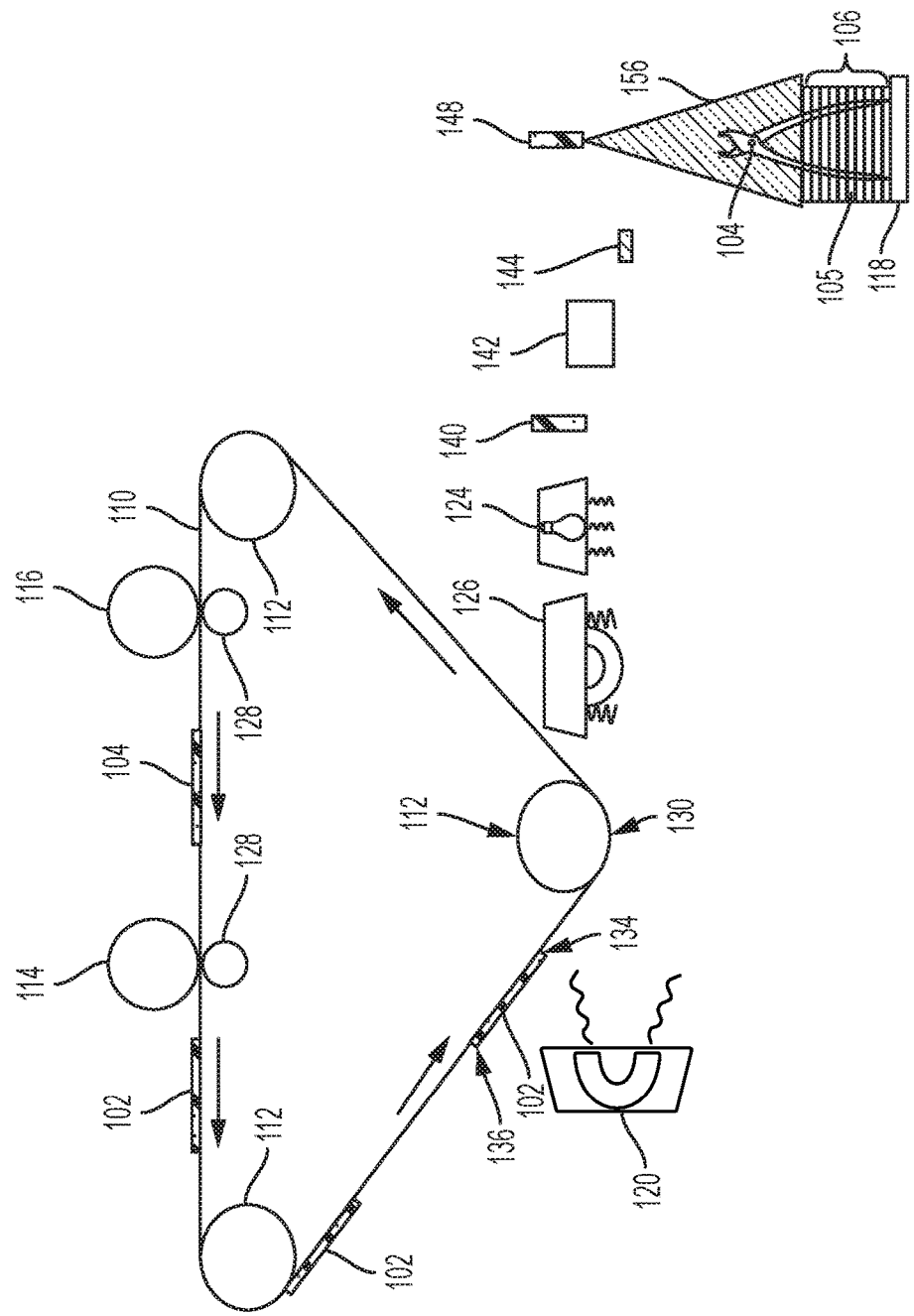
Figure 21:
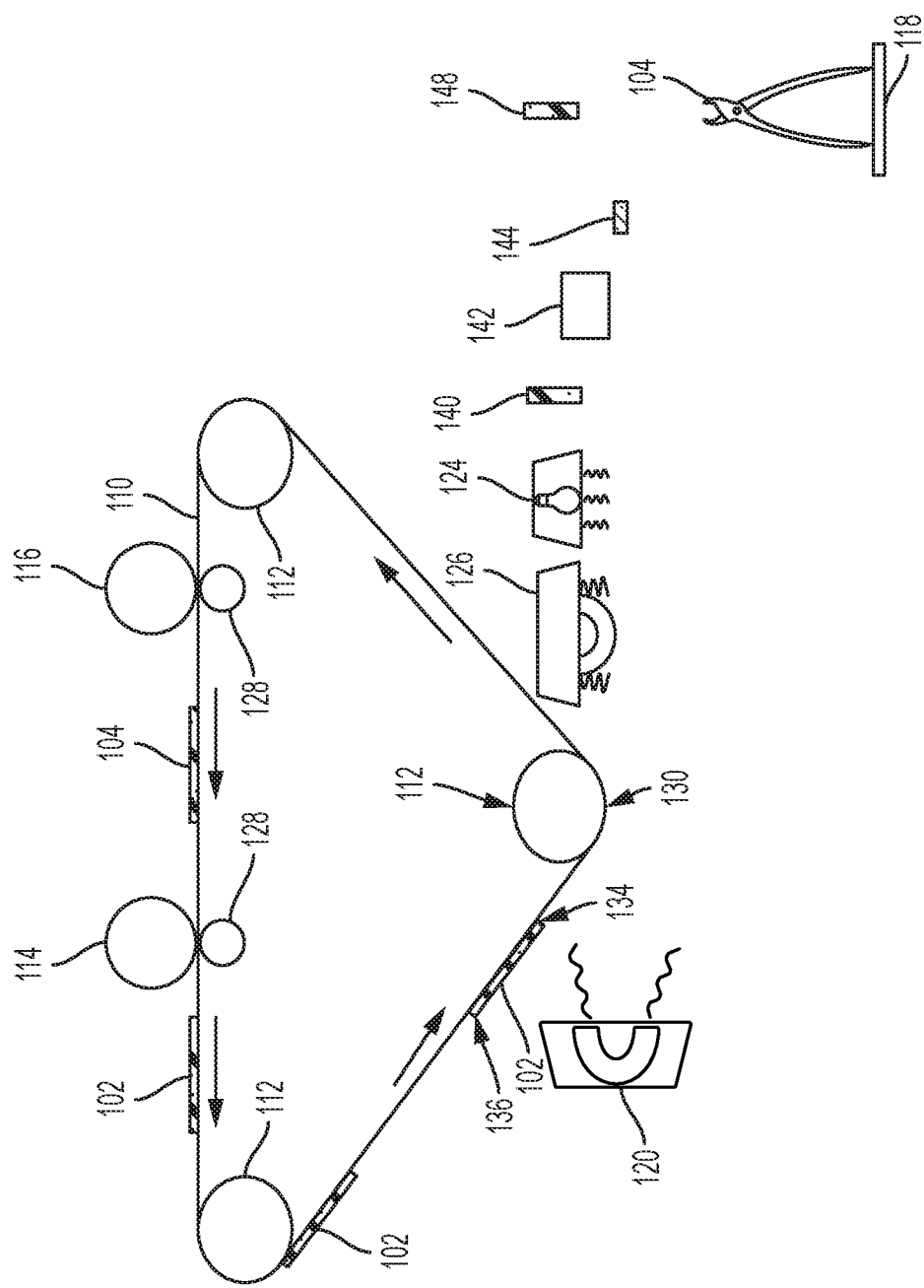

The 3-D structure of the freestanding stack 106 can be output to allow manual removal of the support material 105 using external heated bath; or processing can proceed as shown in FIG. 19-21. More specifically, in FIG. 19, the support material removal station 148 is positioned to receive the now bonded 3-D freestanding stack 106 on the platen 118. The support material removal station 148 applies a solvent 156 that dissolves the support material 105 without affecting the build material 104. Again, as noted above, the solvent utilized will depend upon the chemical makeup of the build material 104 and the support material 105. FIG. 20 illustrates the processing where about half of the support material 105 remains, and a portion of the build material 104 protrudes from the remaining stack of support material 105. FIG. 21 illustrates processing after the support material removal station 148 has applied sufficient solvent 156 to dissolve all the support material 105, leaving only the build material 104 remaining, which leave a completed 3-D structure made of only the build material 104.

Figure 22:
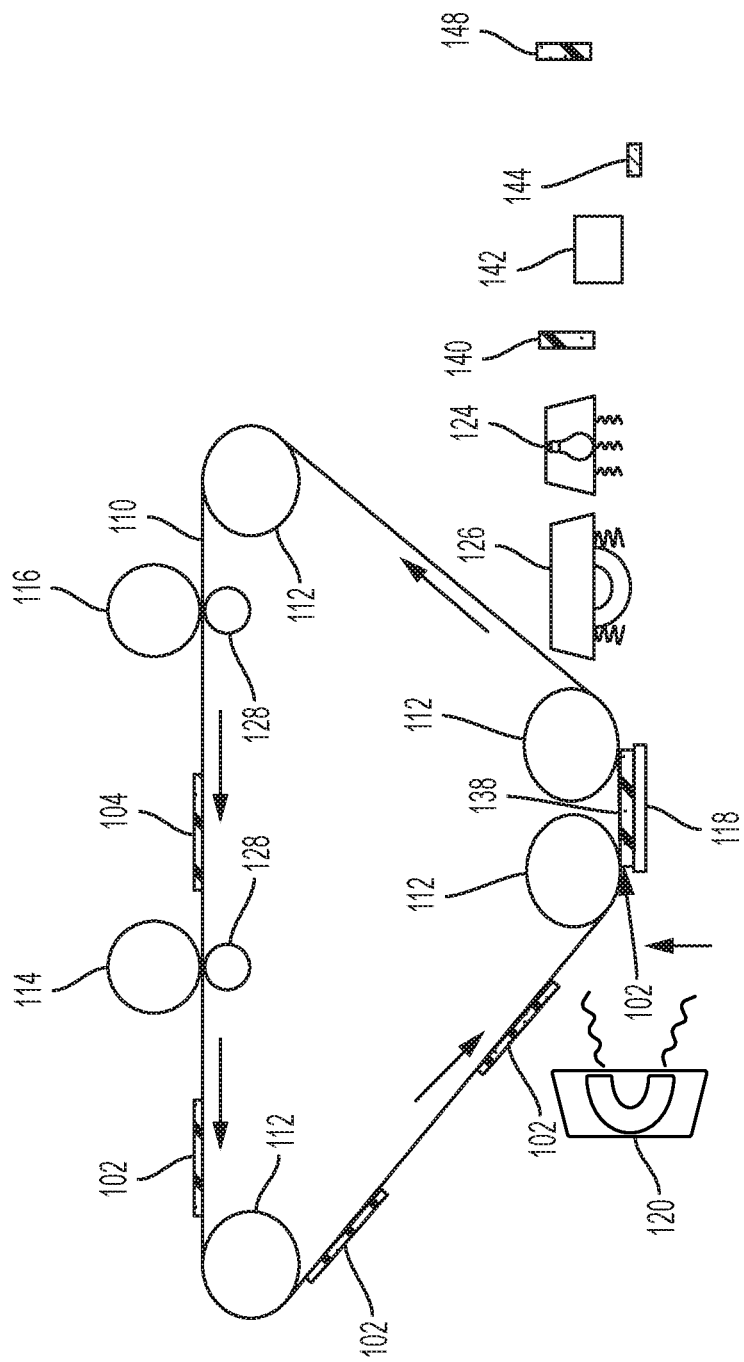
Figure 23:
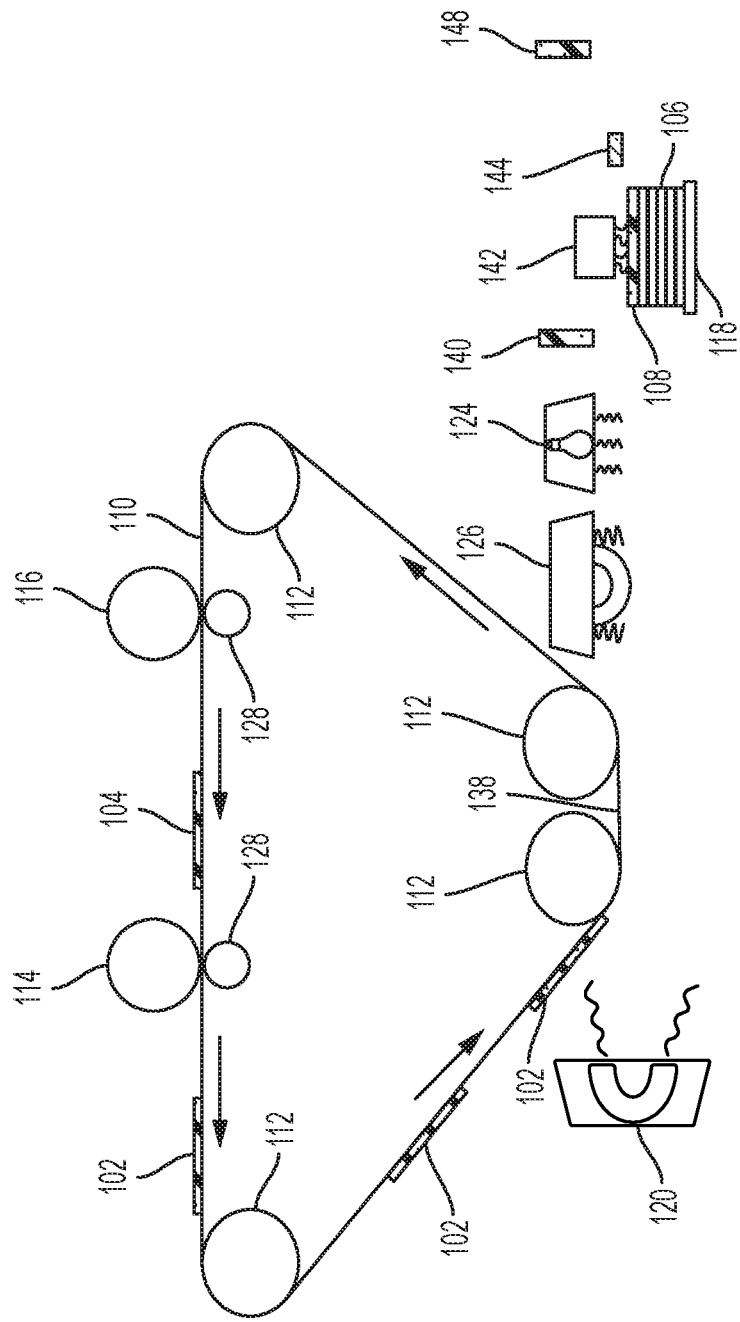
Figure 24:
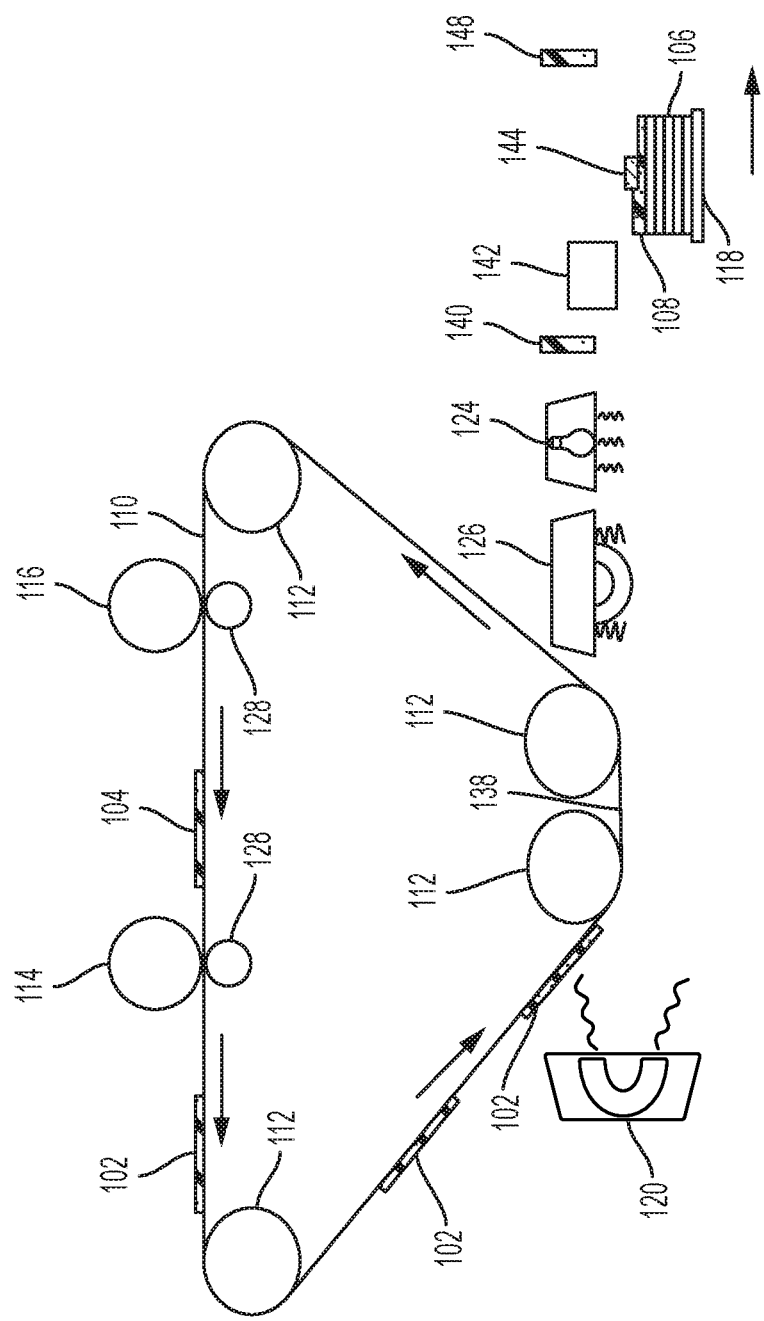

FIGS. 22-24 illustrate an alternative 3-D electrostatic printing structure herein that includes a planar transfuse station 138 in place of the transfuse nip 130 shown in FIG. 1. As shown in FIG. 22, the planar transfuse station 138 is a planar portion of the ITB 110 that is between rollers 112 and is parallel to the platen 118. As shown in FIG. 22, with this structure, when the platen 118 moves to contact the planar transfuse station 138, all of the developed layer 102 is transferred simultaneously to the platen 118 or partially formed stack 106, avoiding the rolling transfuses process shown in FIGS. 2 and 3. FIG. 23 illustrates that the dispenser 142 dispenses leveling material 108, and FIG. 24 illustrates that the mechanical planer levels the leveling material 108 to keep the layers 102 within the stack 106 parallel with the upper surface 119 of the platen 118, as discussed above.

Figure 25:
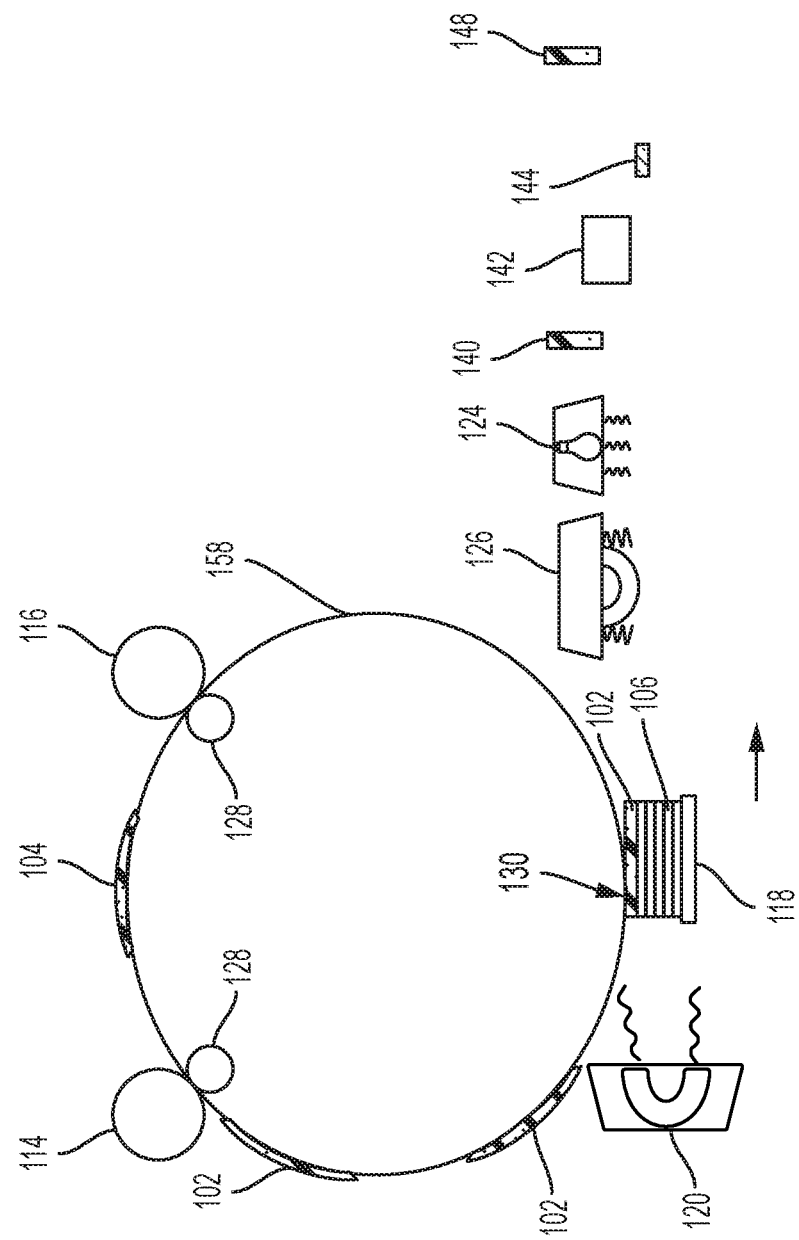
Figure 26:
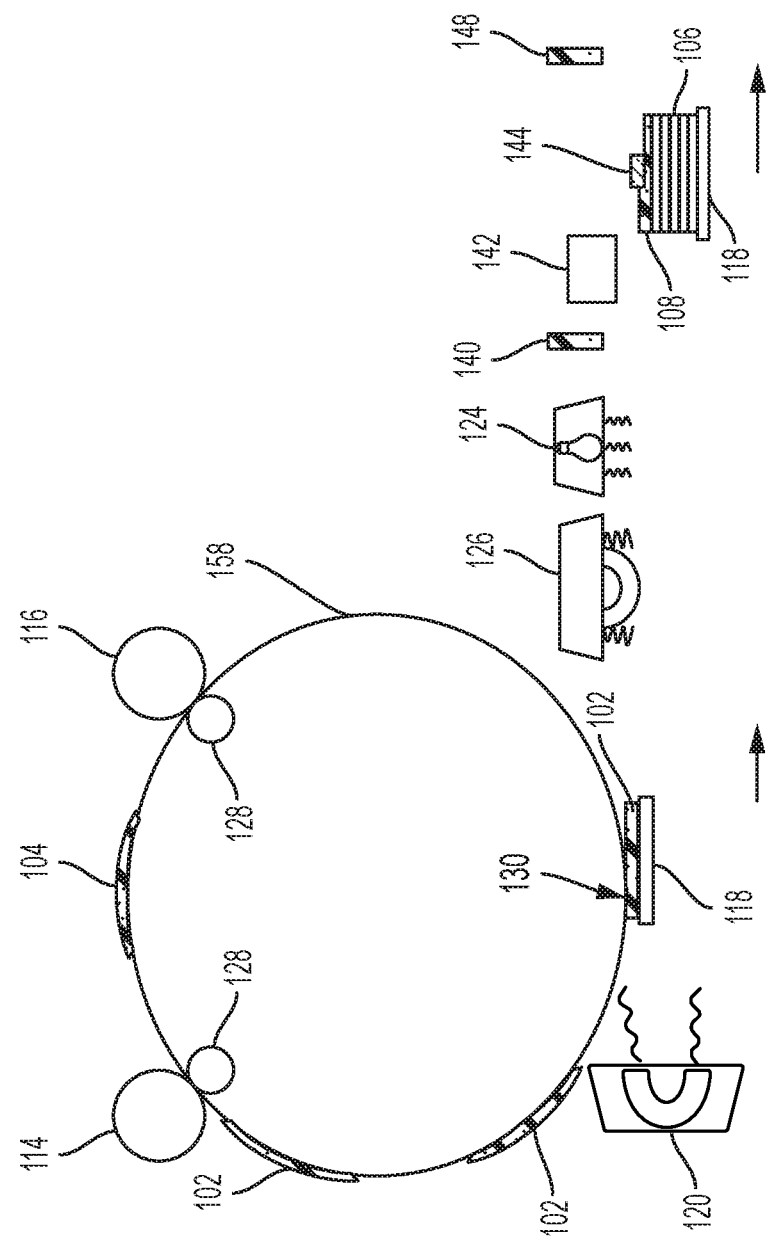

Similarly, as shown in FIG. 25, a drum 158 could be used in place of the ITB 110, with all other components operating as described herein. Thus, the drum 158 could be an intermediate transfer surface receiving material from development stations 114, 116, as described above, or could be a photoreceptor and operate as the photoreceptor 256 described below operates, by maintaining a latent image of charge and receiving materials from development devices 254. As noted above, the dispenser 142 dispenses leveling material 108 and, as shown in FIG. 26, the mechanical planer levels the leveling material 108 to keep the layers 102 within the stack 106 parallel with the upper surface 119 of the platen 118, as discussed above.

Figure 27:
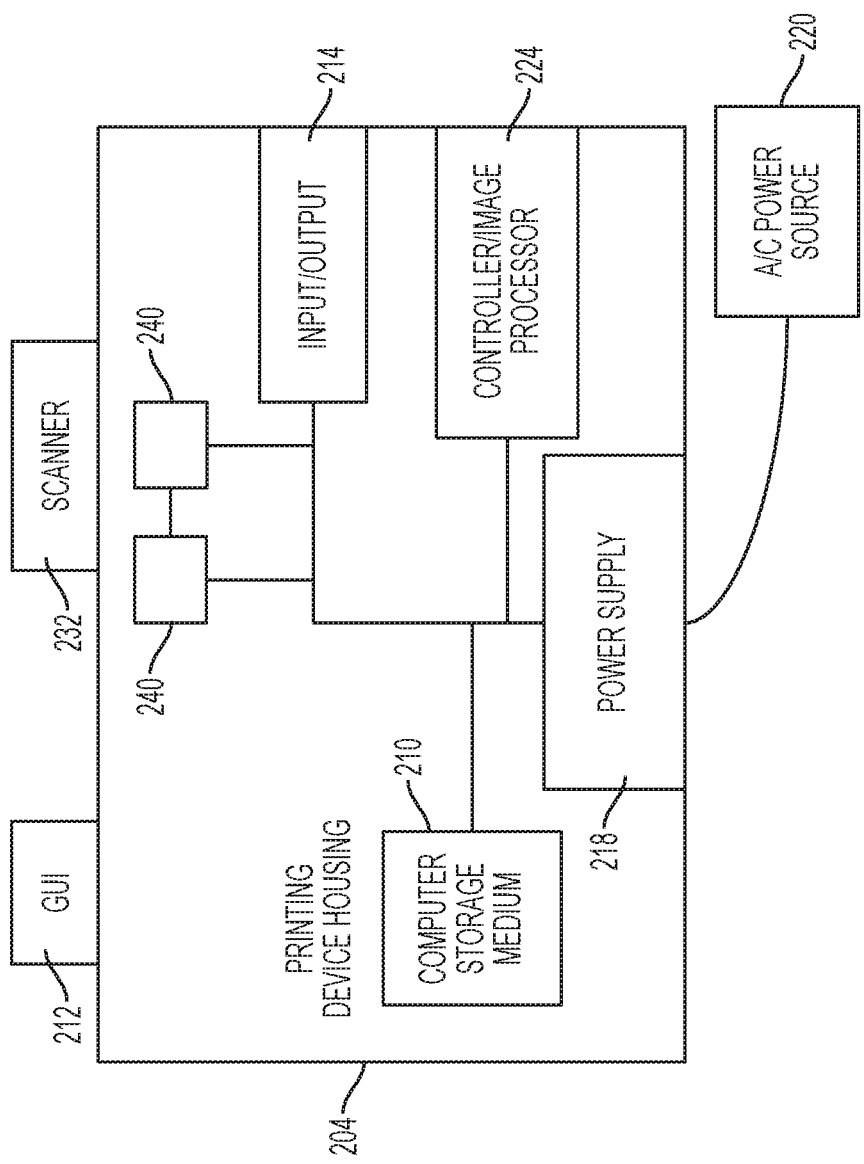
FIG. 27 is a schematic diagram illustrating a printing device herein.

FIG. 27 illustrates many components of 3-D printer structures 204 herein. The 3-D printing device 204 includes a controller/tangible processor 224 and a communications port (input/output) 214 operatively connected to the tangible processor 224 and to a computerized network external to the printing device 204. Also, the printing device 204 can include at least one accessory functional component, such as a graphical user interface (GUI) assembly 212. The user may receive messages, instructions, and menu options from, and enter instructions through, the graphical user interface or control panel 212.

The input/output device 214 is used for communications to and from the 3-D printing device 204 and comprises a wired device or wireless device (of any form, whether currently known or developed in the future). The tangible processor 224 controls the various actions of the printing device 204. A non-transitory, tangible, computer storage medium device 210 (which can be optical, magnetic, capacitor based, etc., and is different from a transitory signal) is readable by the tangible processor 224 and stores instructions that the tangible processor 224 executes to allow the computerized device to perform its various functions, such as those described herein. Thus, as shown in FIG. 27, a body housing has one or more functional components that operate on power supplied from an alternating current (AC) source 220 by the power supply 218. The power supply 218 can comprise a common power conversion unit, power storage element (e.g., a battery, etc), etc.

The 3-D printing device 204 includes at least one marking device (printing engine(s)) 240 that deposits successive layers of build and support material on a platen as described above, and are operatively connected to a specialized image processor 224 (that is different than a general purpose computer because it is specialized for processing image data). Also, the printing device 204 can include at least one accessory functional component (such as a scanner 232) that also operates on the power supplied from the external power source 220 (through the power supply 218).

Figure 28:
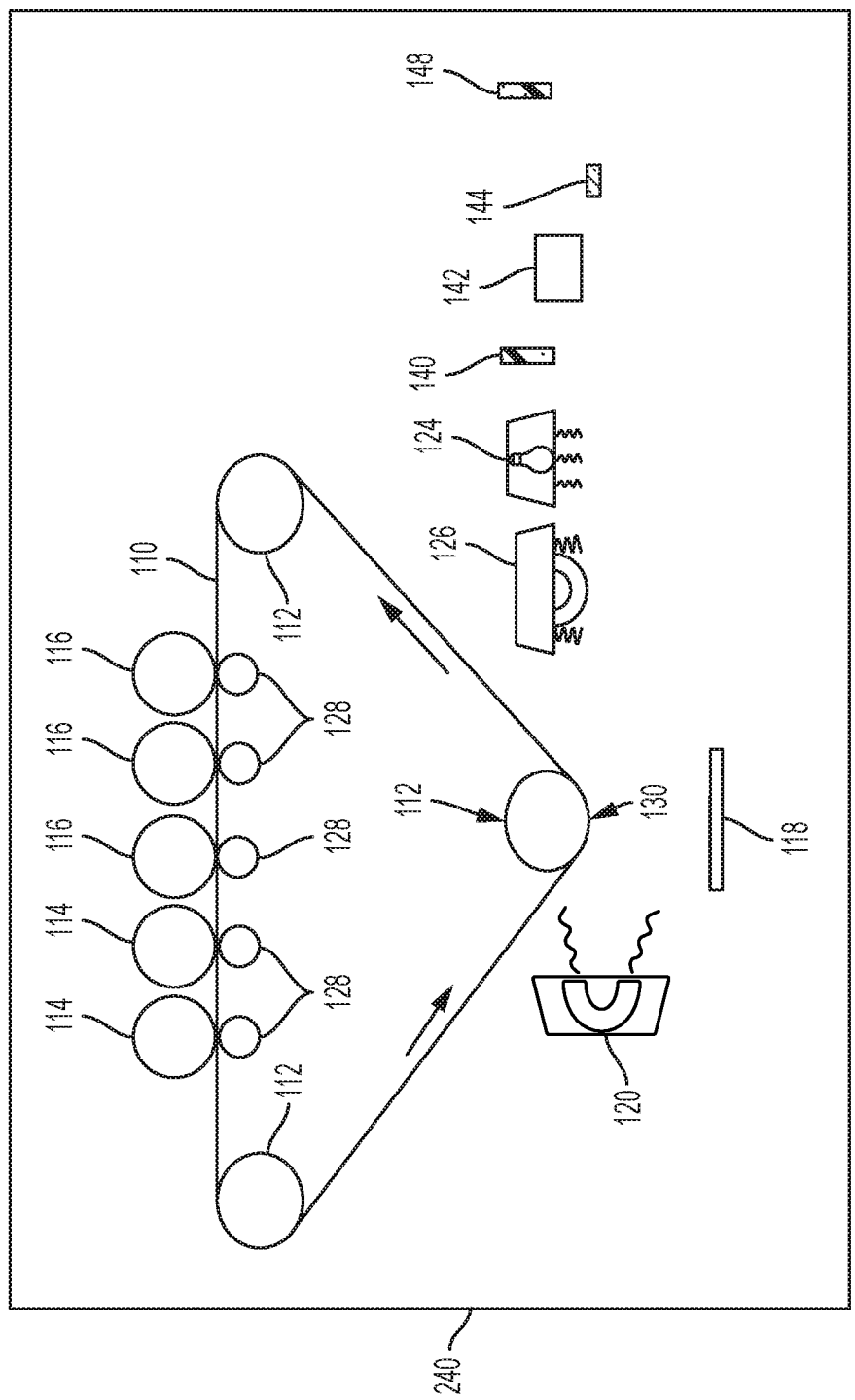
FIG. 28 is a schematic diagram partially illustrating a printing device herein.

The one or more printing engines 240 are intended to illustrate any marking device that applies build and support materials (toner, etc.) whether currently known or developed in the future and can include, for example, devices that use an intermediate transfer belt 110 (as shown in FIG. 28).

Thus, as shown in FIG. 28, each of the printing engine(s) 240 shown in FIG. 27 can utilize one or more potentially different (e.g., different color, different material, etc.) build material development stations 116, one or more potentially different (e.g., different color, different material, etc.) support material development stations 114, etc. The development stations 114, 116 can be any form of development station, whether currently known or developed in the future, such as individual electrostatic marking stations, individual inkjet stations, individual dry ink stations, etc. Each of the development stations 114, 116 transfers a pattern of material to the same location of the intermediate transfer belt 110 in sequence during a single belt rotation (potentially independently of a condition of the intermediate transfer belt 110) thereby, reducing the number of passes the intermediate transfer belt 110 must make before a full and complete image is transferred to the intermediate transfer belt 110. While FIG. 28 illustrates five development stations adjacent or in contact with a rotating belt (110), as would be understood by those ordinarily skilled in the art, such devices could use any number of marking stations (e.g., 2, 3, 5, 8, 11, etc.).

Figure 29:
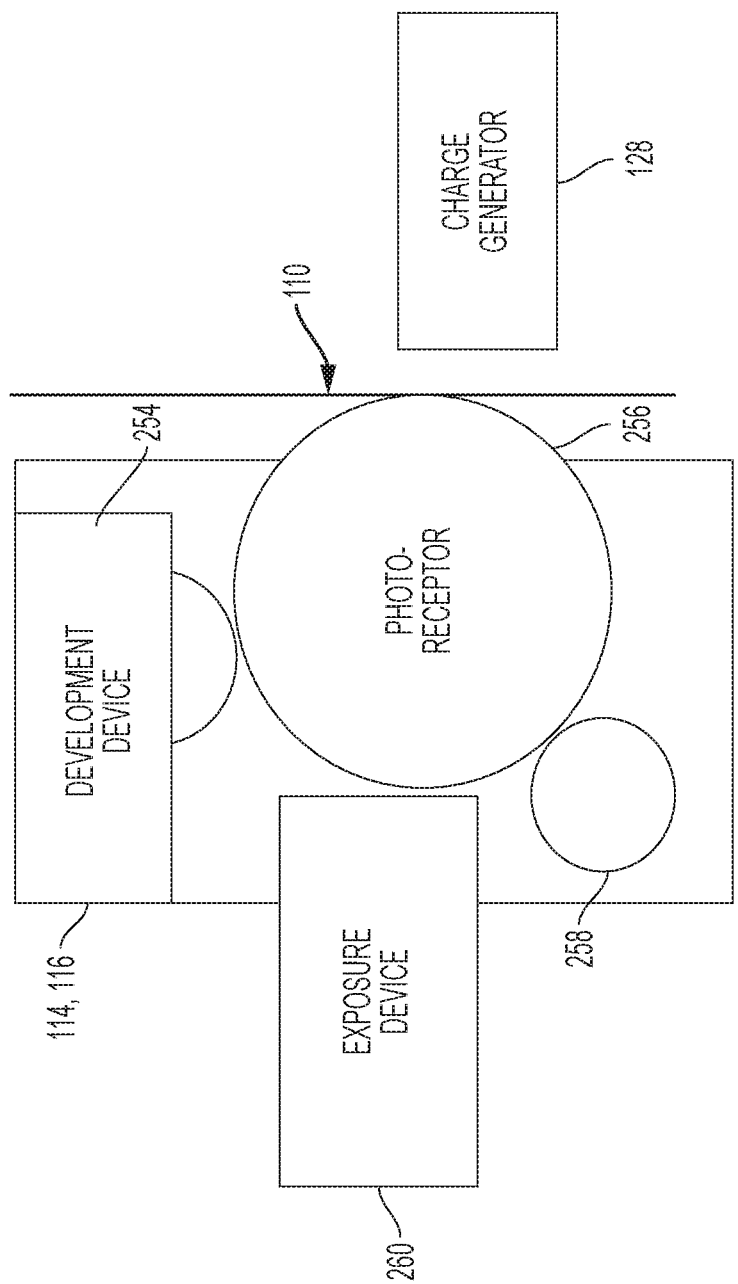
FIG. 29 is a schematic diagram illustrating a development device herein.

One exemplary individual electrostatic development station 114, 116 is shown in FIG. 29 positioned adjacent to (or potentially in contact with) intermediate transfer belt 110. Each of the individual electrostatic development stations 114, 116 includes its own charging station 258 that creates a uniform charge on an internal photoreceptor 256, an internal exposure device 260 that patterns the uniform charge into a latent image of charge, and an internal development device 254 that transfers build or support material to the photoreceptor 256 in a pattern matching the charge latent image. The pattern of build or support material is then drawn from the photoreceptor 256 to the intermediate transfer belt 110 by way of an opposite charge of the intermediate transfer belt 110 relative to the charge of the build or support material, that is usually created by a charge generator 128 on the opposite side of the intermediate transfer belt 110.

As shown in U.S. Pat. No. 8,488,994, an additive manufacturing system for printing a 3-D part using electrophotography is known. The system includes a photoconductor component having a surface, and a development station, where the development station is configured to developed layers of a material on the surface of the photoconductor component. The system also includes a transfer medium configured to receive the developed layers from the surface of the rotatable photoconductor component, and a platen configured to receive the developed layers from the transfer component in a layer-by-layer manner to print the 3-D part from at least a portion of the received layers.

With respect to UV curable toners, as disclosed in U.S. Pat. No. 7,250,238 it is known to provide a UV curable toner composition, as are methods of utilizing the UV curable toner compositions in printing processes. U.S. Pat. No. 7,250,238 discloses various toner emulsion aggregation processes that permit the generation of toners that in embodiments can be cured, that is by the exposure to UV radiation, such as UV light of has about 100 nm to about 400 nm. In U.S. Pat. No. 7,250,238, the toner compositions produced can be utilized in various printing applications such as temperature sensitive packaging and the production of foil seals. In U.S. Pat. No. 7,250,238 embodiments relate to a UV curable toner composition comprised of an optional colorant, an optional wax, a polymer generated from styrene, and acrylate selected from the group consisting of butyl acrylate, carboxyethyl acrylate, and a UV light curable acrylate oligomer. Additionally, these aspects relate to a toner composition comprised of a colorant such as a pigment, an optional wax, and a polymer generated from a UV curable cycloaliphatic epoxide.

Moreover, U.S. Pat. No. 7,250,238 discloses a method of forming a UV curable toner composition comprising mixing a latex containing a polymer formed from styrene, butyl acrylate, a carboxymethyl acrylate, and a UV curable acrylate with a colorant and wax; adding flocculant to this mixture to optionally induce aggregation and form toner precursor particles dispersed in a second mixture; heating the toner precursor particles to a temperature equal to or higher than the glass transition temperature (Tg) of the polymer to form toner particles; optionally washing the toner particles; and optionally drying the toner particles. A further aspect relates to the toner particles produced by this method.

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

Many computerized devices are discussed above. Computerized devices that include chip-based central processing units (CPU's), input/output devices (including graphic user interfaces (GUI), memories, comparators, tangible processors, etc.) are well-known and readily available devices produced by manufacturers such as Dell Computers, Round Rock Tex., USA and Apple Computer Co., Cupertino Calif., USA. Such computerized devices commonly include input/output devices, power supplies, tangible processors, electronic storage memories, wiring, etc., the details of which are omitted herefrom to allow the reader to focus on the salient aspects of the systems and methods described herein. Similarly, printers, copiers, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes.

For the purposes of this invention, the term fixing means the drying, hardening, polymerization, crosslinking, binding, or addition reaction or other reaction of the coating. In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements). Further, the terms automated or automatically mean that once a process is started (by a machine or a user), one or more machines perform the process without further input from any user. In the drawings herein, the same identification numeral identifies the same or similar item.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A three-dimensional (3-D) printer comprising:
    an intermediate transfer surface;
    a build material development station positioned to transfer build material to said intermediate transfer surface;
    a support material development station positioned to transfer support material to said intermediate transfer surface, said build material development station and said support material development station transfer layers of said build material and said support material to said intermediate transfer surface;
    a platen having a flat surface positioned to contact said intermediate transfer surface, said intermediate transfer surface transfers a top layer of said build material and said support material to said flat surface of said platen as said platen contacts one of said layers on said intermediate transfer surface, said top layer is capable of not being parallel to said flat surface of said platen;
    a dispenser positioned to deposit a leveling material on said top layer; and
    a mechanical planer positioned to contact and level said leveling material on said top layer on said platen,
    said mechanical planer comprises a structure that moves relative to said platen in a direction parallel to said flat surface of said platen to remove a portion of said leveling material and leave another portion of said leveling material on top of said top layer, and make the top of said leveling material parallel to said flat surface of said platen and thereby correct for said top layer not being parallel to said flat surface of said platen.

2. The 3-D printer according to claim 1, said leveling material joins relatively more readily with said build material, and joins relatively less readily with said support material.

3. The 3-D printer according to claim 1, said build material attracts said leveling material, and said support material repels said leveling material.

4. The 3-D printer according to claim 1, said mechanical planer comprises an elongated structure.

5. The 3-D printer according to claim 1, said mechanical planer comprises counter-rotating rollers.

6. The 3-D printer according to claim 1, said dispenser comprises a sprayer, a hopper, or a chute.

7. A three-dimensional (3-D) printer comprising:
    an intermediate transfer surface;
    a build material development station positioned to electrostatically transfer build material to said intermediate transfer surface;
    a support material development station positioned to electrostatically transfer support material to said intermediate transfer surface, said build material development station and said support material development station transfer layers of said build material and said support material to said intermediate transfer surface;
    a transfuse station adjacent said intermediate transfer surface;
    a platen having a flat surface positioned to repeatedly contact said intermediate transfer surface, said platen moving relative to said intermediate transfer surface, said intermediate transfer surface transfers a top layer of said build material and said support material to said flat surface of said platen each time said platen contacts one of said layers on said intermediate transfer surface at said transfuse station to successively form a freestanding stack of said layers on said flat surface of said platen, and said top layer is capable of not being parallel to said flat surface of said platen;
    a fusing station positioned to apply heat and pressure to said freestanding stack to fuse said layers together;
    a dispenser positioned to deposit a leveling material on said top layer; and a mechanical planer positioned to contact and level said leveling material on said freestanding stack, said mechanical planer comprises a structure that moves relative to said platen in a direction parallel to said flat surface of said platen to remove a portion of said leveling material and leave another portion of said leveling material on top of said top layer, and make the top of said leveling material parallel to said flat surface of said platen and thereby correct for said top layer not being parallel to said flat surface of said platen, and said platen moves to said fusing station after said mechanical planer levels said leveling material to fuse said leveling material to said freestanding stack.

8. The 3-D printer according to claim 7, said leveling material joins relatively more readily with said build material, and joins relatively less readily with said support material.

9. The 3-D printer according to claim 7, said build material attracts said leveling material, and said support material repels said leveling material.

10. The 3-D printer according to claim 7, said mechanical planer comprises an elongated structure.

11. The 3-D printer according to claim 7, said mechanical planer comprises counter-rotating rollers.

12. The 3-D printer according to claim 7, said dispenser comprises a sprayer, a hopper, or a chute.

13. A three-dimensional (3-D) printer comprising:

an intermediate transfer belt (ITB);

a build material development station positioned to electrostatically transfer build material to said ITB;

a support material development station positioned to electrostatically transfer support material to said ITB, said build material development station and said support material development station transfer layers of said build material and said support material to said ITB;

a transfuse station adjacent said ITB;

a platen having a flat surface positioned to repeatedly contact said ITB, said platen moving relative to said ITB, said ITB transfers a top layer of said build material and said support material to said flat surface of said platen each time said platen contacts one of said layers on said ITB at said transfuse station to successively form a freestanding stack of said layers on said flat surface of said platen, and said top layer is capable of not being parallel to said flat surface of said platen;

a fusing station positioned to apply heat and pressure to said freestanding stack to fuse said layers together;

a curing station positioned to apply heat and ultraviolet light to said freestanding stack to crosslink polymers in said build material;

a dispenser positioned separate from said ITB and positioned to deposit a leveling material on said top layer; and a mechanical planer positioned separate from said ITB and positioned to contact and level said leveling material on said freestanding stack, said mechanical planer comprises a structure that moves relative to said platen in a direction parallel to said flat surface of said platen to remove a portion of said leveling material and leave another portion of said leveling material on top of said top layer, and make the top of said leveling material parallel to said flat surface of said platen and thereby correct for said layer not being parallel to said flat surface of said platen, and said platen moves to said fusing station after said mechanical planer levels said leveling material to fuse said leveling material to said freestanding stack.

14. The 3-D printer according to claim 13, said leveling material joins relatively more readily with said build material, and joins relatively less readily with said support material.

15. The 3-D printer according to claim 13, said build material attracts said leveling material, and said support material repels said leveling material.

16. The 3-D printer according to claim 13, said mechanical planer comprises an elongated structure.

17. The 3-D printer according to claim 13, said mechanical planer comprises counter-rotating rollers.

* * * * *